(12) United States Patent
Bhagwat et al.

(10) Patent No.: US 7,536,723 B1
(45) Date of Patent: *May 19, 2009

(54) AUTOMATED METHOD AND SYSTEM FOR MONITORING LOCAL AREA COMPUTER NETWORKS FOR UNAUTHORIZED WIRELESS ACCESS

(75) Inventors: Pravin Bhagwat, Kendall Park, NJ (US); Shantanu Gogate, Pune (IN); David C. King, Menlo Park, CA (US)

(73) Assignee: AirTight Networks, Inc., Mountain View, CA (US)

( * ) Notice: Subject to any disclaimer, the term of this patent is extended or adjusted under 35 U.S.C. 154(b) by 906 days.

This patent is subject to a terminal disclaimer.

(21) Appl. No.: 10/931,926

(22) Filed: Aug. 31, 2004

Related U.S. Application Data

(60) Provisional application No. 60/543,631, filed on Feb. 11, 2004.

(51) Int. Cl.
*G06F 11/00* (2006.01)
*G06F 12/16* (2006.01)
*G06F 15/18* (2006.01)
*G08B 23/00* (2006.01)

(52) U.S. Cl. ............................. 726/23; 726/22; 726/24; 726/25

(58) Field of Classification Search .................. 726/23, 726/22, 24, 25
See application file for complete search history.

(56) References Cited

U.S. PATENT DOCUMENTS 5,987,611 A    11/1999   Freund (Continued)

FOREIGN PATENT DOCUMENTS

GB    2389483 A    12/2003

(Continued)

OTHER PUBLICATIONS

Hatami et al., In-Building Intruder Detection for WLAN Access, Center for Wireless Information Network Studies, Worcester Polytechnic Institute (WPI), MA, USA, 2004 Position Location and Navigation Symposium, Apr. 26-29, 2004, pp. 592-597.

(Continued)

*Primary Examiner*—David García Cervetti
(74) *Attorney, Agent, or Firm*—Airtight Networks; Hemant M. Chaskar

(57) ABSTRACT

According to an embodiment of the present invention, the wireless activity in a geographic area containing LAN connection ports is monitored using one or more sensor devices, called sniffers. By analyzing said wireless activity, one or more APs that are operating in said geographic area are identified. The active APs so identified are classified into three categories, namely "authorized" APs (those that are allowed by network administrator), "unauthorized" APs (those that are not allowed by the network administrator, but are still connected to the LAN of interest) and "external" APs (those that are not allowed by network administrator but are not connected to the LAN of interest, for example APs connected to the neighbor's LAN) by conducting one or more tests. The sniffers continue to monitor the selected geographic area to detect any wireless station attempting to connect to or communicating with the one or more identified unauthorized APs. Upon identifying unauthorized AP and/or intruding wireless station an indication is transferred to the prevention process.

25 Claims, 11 Drawing Sheets

U.S. PATENT DOCUMENTS

| | | | |
|---|---|---|---|
| 6,618,355 B1 | 9/2003 | Gulliford et al. | |
| 6,647,418 B1 | 11/2003 | Maria et al. | |
| 6,701,432 B1 | 3/2004 | Deng et al. | |
| 6,728,670 B2* | 4/2004 | Schenkel et al. | 704/224 |
| 6,735,702 B1 | 5/2004 | Vavatkar et al. | |
| 6,745,333 B1* | 6/2004 | Thomsen | 726/23 |
| 6,753,702 B2 | 6/2004 | Mizuno et al. | |
| 6,754,488 B1* | 6/2004 | Won et al. | 455/424 |
| 6,897,776 B1* | 5/2005 | Haycraft | 340/539.24 |
| 6,957,067 B1* | 10/2005 | Iyer et al. | 455/435.1 |
| 7,042,852 B2* | 5/2006 | Hrastar | 370/310 |
| 7,058,796 B2* | 6/2006 | Lynn et al. | 713/1 |
| 7,127,524 B1 | 10/2006 | Renda et al. | |
| 7,154,888 B1 | 12/2006 | Li et al. | |
| 7,257,107 B2* | 8/2007 | Swier et al. | 370/338 |
| 7,277,404 B2* | 10/2007 | Tanzella et al. | 370/310 |
| 7,316,031 B2* | 1/2008 | Griffith et al. | 726/22 |
| 7,331,061 B1 | 2/2008 | Ramsey et al. | 726/23 |
| 7,336,670 B1* | 2/2008 | Calhoun et al. | 370/401 |
| 7,339,914 B2* | 3/2008 | Bhagwat et al. | 370/338 |
| 7,340,768 B2* | 3/2008 | Rosenberger | 726/4 |
| 7,346,065 B2 | 3/2008 | Kobayashi | |
| 7,383,577 B2* | 6/2008 | Hrastar et al. | 726/23 |
| 7,453,840 B1* | 11/2008 | Dietrich et al. | 370/328 |
| 2001/0052014 A1 | 12/2001 | Sheymov et al. | |
| 2002/0143935 A1* | 10/2002 | Schenkel et al. | 709/224 |
| 2003/0051032 A1* | 3/2003 | Schenkel et al. | 709/224 |
| 2003/0051167 A1 | 3/2003 | King et al. | |
| 2003/0126468 A1 | 7/2003 | Markham | |
| 2003/0135762 A1* | 7/2003 | Macaulay | 713/201 |
| 2003/0149891 A1 | 8/2003 | Thompsen | |
| 2003/0161265 A1* | 8/2003 | Cao et al. | 370/229 |
| 2003/0167405 A1 | 9/2003 | Freund et al. | |
| 2003/0185244 A1* | 10/2003 | Wu et al. | 370/503 |
| 2003/0186679 A1* | 10/2003 | Challener et al. | 455/410 |
| 2003/0188012 A1 | 10/2003 | Ford | |
| 2003/0217283 A1* | 11/2003 | Hrastar et al. | 713/200 |
| 2003/0217289 A1* | 11/2003 | Ammon et al. | 713/201 |
| 2003/0219008 A1* | 11/2003 | Hrastar | 370/352 |
| 2003/0221006 A1* | 11/2003 | Kuan et al. | 709/225 |
| 2003/0229703 A1* | 12/2003 | Falola et al. | 709/229 |
| 2003/0232598 A1* | 12/2003 | Aljadeff et al. | 455/41.2 |
| 2003/0233567 A1* | 12/2003 | Lynn et al. | 713/200 |
| 2003/0236990 A1* | 12/2003 | Hrastar et al. | 713/200 |
| 2004/0003285 A1* | 1/2004 | Whelan et al. | 713/201 |
| 2004/0008652 A1* | 1/2004 | Tanzella et al. | 370/338 |
| 2004/0023640 A1* | 2/2004 | Ballai | 455/411 |
| 2004/0028017 A1* | 2/2004 | Whitehill et al. | 370/338 |
| 2004/0047356 A1 | 3/2004 | Bauer | |
| 2004/0049695 A1* | 3/2004 | Choi et al. | 713/200 |
| 2004/0049699 A1* | 3/2004 | Griffith et al. | 713/201 |
| 2004/0078151 A1 | 4/2004 | Aljadeff et al. | |
| 2004/0078717 A1 | 4/2004 | Allred et al. | |
| 2004/0085906 A1* | 5/2004 | Ohtani et al. | 370/248 |
| 2004/0098485 A1 | 5/2004 | Larson et al. | |
| 2004/0098610 A1 | 5/2004 | Hrastar | |
| 2004/0103282 A1 | 5/2004 | Meier et al. | |
| 2004/0107219 A1* | 6/2004 | Rosenberger | 707/104.1 |
| 2004/0111640 A1* | 6/2004 | Baum | 713/201 |
| 2004/0143751 A1 | 7/2004 | Peikari | |
| 2004/0157624 A1* | 8/2004 | Hrastar | 455/456.1 |
| 2004/0203764 A1* | 10/2004 | Hrastar et al. | 455/435.1 |
| 2004/0209617 A1* | 10/2004 | Hrastar | 455/434 |
| 2004/0209634 A1* | 10/2004 | Hrastar | 455/515 |
| 2004/0210654 A1* | 10/2004 | Hrastar | 709/224 |
| 2004/0215972 A1 | 10/2004 | Sung et al. | |
| 2004/0218602 A1* | 11/2004 | Hrastar | 370/390 |
| 2005/0025182 A1 | 2/2005 | Nazari | |
| 2005/0030929 A1* | 2/2005 | Swier et al. | 370/338 |
| 2005/0039047 A1 | 2/2005 | Raikar | |
| 2005/0042999 A1 | 2/2005 | Rappaport | |
| 2005/0050365 A1* | 3/2005 | Seki et al. | 713/201 |
| 2005/0094568 A1* | 5/2005 | Judd | 370/242 |
| 2005/0094630 A1* | 5/2005 | Valdevit | 370/360 |
| 2005/0111460 A1* | 5/2005 | Sahita | 370/395.3 |
| 2005/0114700 A1 | 5/2005 | Barrie et al. | |
| 2005/0128989 A1 | 6/2005 | Bhagwat et al. | |
| 2005/0174961 A1* | 8/2005 | Hrastar | 370/328 |
| 2005/0226195 A1 | 10/2005 | Paris et al. | |
| 2006/0123133 A1 | 6/2006 | Hrastar | |
| 2006/0150250 A1* | 7/2006 | Lee et al. | 726/23 |
| 2006/0209700 A1* | 9/2006 | Sundar et al. | 370/248 |
| 2006/0235735 A1 | 10/2006 | Sagfors et al. | |
| 2007/0094741 A1* | 4/2007 | Lynn et al. | 726/26 |
| 2007/0180244 A1* | 8/2007 | Halasz et al. | 713/168 |
| 2007/0189290 A1* | 8/2007 | Bauer | 370/390 |
| 2008/0101283 A1* | 5/2008 | Calhoun et al. | 370/328 |
| 2008/0109879 A1* | 5/2008 | Bhagwat et al. | 726/3 |
| 2008/0115204 A1* | 5/2008 | Ramsey et al. | 726/13 |
| 2009/0034431 A1* | 2/2009 | Nagarajan et al. | 370/254 |

FOREIGN PATENT DOCUMENTS

| | | | |
|---|---|---|---|
| WO | 2001093531 A3 | 6/2001 | |
| WO | 2004019559 A3 | 3/2004 | |
| WO | 2004028121 A2 | 4/2004 | |
| WO | 2004059912 A1 | 7/2004 | |
| WO | WO 2004/095192 | 11/2004 | |

OTHER PUBLICATIONS

Yang et al., Intrusion Detection Solution to WLANs, Software Base, Civil Aviation University of China, Tianjin, China, IEEE 6th Circuits and Systems (CAS) Symposium on Emerging Technologies: Mobile and Wireless Communication, Shanghai, China, May 31-Jun. 2, 2004, vol. 2, pp. 553-556.

Zhang et al., Intrusion Detection Techniques for Mobile Wireless Networks, Wireless Networks, vol. 9, Issue 5 (Sep. 2003), pp. 545-556.

Yeo et al., A Framework for Wireless LAN Monitoring and Its Applications, Proceedings of the 2004 ACM workshop on Wireless security, Oct. 1, 2004, pp. 70-79.

Bellardo et al., Denial-of-Service Attacks: Real Vulnerabilities and Practical Solutions, Department of Computer and Science Engineering, University of California at San Diego, Proceedings of the USENIX Security Symposium, Washington, DC, Aug. 2003.

Lim et al., Wireless Intrusion Detection and Response, IEEE., Proceedings of the 2003 IEEE Workshop on Information Assurance United States Military Academy, West Point, NY, Jun. 2003.

International Search Report, International Application No. PCT/US06/16364.

Chirumamilla et al., Agent based intrusion detection and response system for wireless LANs, IEEE International Conference on Communications (ICC), May 11-15, 2003, pp. 492-496, vol. 1.

Korba, Security system for wireless local area networks, Personal, Indoor and Mobile Radio Communications, Sep. 8-11, 1998, pp. 1550-1554, vol. 3, Boston, USA.

* cited by examiner

AUTOMATED METHOD AND SYSTEM FOR MONITORING LOCAL AREA COMPUTER NETWORKS FOR UNAUTHORIZED WIRELESS ACCESS

CROSS-REFERENCE TO RELATED APPLICATIONS

This present application claims priority to U.S. Provisional Application No. 60/543,631, titled "An Automated Method and an RF Sensor System for Wireless Unauthorized Transmission, Intrusion Detection and Prevention," filed Feb. 11, 2004, commonly assigned, and hereby incorporated by reference for all purposes.

The present invention also relates to U.S. Ser. No. 10/931,585 (now U.S. Pat. No. 7,339,914), titled "An Automated Sniffer Apparatus and Method for Monitoring Computer Systems for Unauthorized Wireless Access", filed on Aug. 31, 2004, which claims priority to U.S. Provisional Application No. 60/543,631, titled "An Automated Method and an RF Sensor System for Wireless Unauthorized Transmission, Intrusion Detection and Prevention," filed Feb. 11, 2004, commonly assigned, and each of which is hereby incorporated by reference for all purposes.

BACKGROUND OF THE INVENTION

The present invention relates generally to wireless computer networking techniques. More particularly, the invention provides a method and a system for providing intrusion detection for local area wireless networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", Bluetooth, and others.

Computer systems proliferated from academic and specialized science applications to day to day business, commerce, information distribution and home applications. Such systems include personal computers, which are often called "PCs" for short, to large mainframe and server class computers. Powerful mainframe and server class computers run specialized applications for banks, small and large companies, e-commerce vendors and governments. Smaller personal computers can be found in many if not all offices, homes, and even local coffee shops. These computers interconnect with each other through computer communication networks based on packet switching technology such as the Internet protocol or IP. The computer systems located within a specific local geographic area such as office, home or other indoor and outdoor premises interconnect using a Local Area Network, commonly called, LAN. Ethernet is by far the most popular networking technology for LANs. The LANs interconnect with each other using a Wide Area Network called "WAN" such as the famous Internet. Although much progress occurred with computers and networking, we now face a variety of security threats on many computing environments from the hackers connected to the computer network. The application of wireless communication to computer networking further accentuates these threats.

As merely an example, the conventional LAN is usually deployed using an Ethernet based infrastructure comprising cables, hubs switches, and other elements. A number of connection ports (e.g., Ethernet ports) are used to couple various computer systems to the LAN. A user can connect to the LAN by physically attaching a computing device such as laptop, desktop or handheld computer to one of the connection ports using physical wires or cables. Other computer systems such as database computers, server computers, routers and Internet gateways also connect to the LAN to provide specific functionalities and services. Once physically connected to the LAN, the user often accesses a variety of services such as file transfer, remote login, email, WWW, database access, and voice over IP. Security of the LAN often occurs by controlling access to the physical space where the LAN connection ports are located.

Although conventional wired networks using Ethernet technology proliferated, wireless communication technologies are increasing in popularity. That is, wireless communication technologies wirelessly connect users to the computer communication networks. A typical application of these technologies provides wireless access to the local area network in the office, home, public hot-spots, and other geographical locations. As merely an example, the IEEE 802.11 family of standards, commonly called WiFi, is the common standard for such wireless application. Among WiFi, the 802.11b standard-based WiFi often operates at 2.4 GHz unlicensed radio frequency spectrum and offers wireless connectivity at speeds up to 11 Mbps. The 802.11g compliant WiFi offers even faster connectivity at about 54 Mbps and operates at 2.4 GHz unlicensed radio frequency spectrum. The 802.11a provides speeds up to 54 Mbps operating in the 5 GHz unlicensed radio frequency spectrum. The WiFi enables a quick and effective way of providing wireless extension to the existing LAN.

In order to provide wireless extension of the LAN using WiFi, one or more WiFi access points (APs) connect to the LAN connection ports either directly or through intermediate equipment such as WiFi switch. A user now wirelessly connects to the LAN using a device equipped with WiFi radio, commonly called wireless station, which communicates with the AP. The connection is free from cable and other physical encumbrances and allows the user to "Surf the Web", check e-mail or use enterprise computer applications in an easy and efficient manner. Unfortunately, certain limitations still exist with WiFi. That is, the radio waves often cannot be contained in the physical space bounded by physical structures such as the walls of a building. Hence, wireless signals often spill outside the area of interest. Unauthorized users can wirelessly connect to the AP and hence gain access to the LAN from the spillage areas such as the street, parking lot, and neighbor's premises. Consequently, the conventional security measure of controlling access to the physical space where the LAN connection ports are located is now inadequate.

In order to prevent unauthorized access to the LAN over WiFi, the AP can employ certain techniques. For example, the user is required to carry out authentication handshake with the AP (or a WiFi switch that resides between the AP and the existing LAN) before being able to connect to the LAN. Examples of such handshake are Wireless Equivalent Privacy (WEP) based shared key authentication, 802.1x based port access control, 802.11i based authentication. The AP can provide additional security measures such as encryption, firewall. Other techniques also exist to enhance security of the LAN over WiFi.

Despite these measures, many limitations still exist. As merely an example, a threat of an unauthorized AP being connected to the LAN often remains with the LANs. The unauthorized AP creates security vulnerability. The unauthorized AP allows wireless intruders to connect to the LAN through itself. That is, the intruder accesses the LAN and any proprietary information on computers and servers on the LAN without the knowledge of the owner of the LAN. Soft APs, ad hoc networks, and misconfigured APs connected to the LAN also pose similar threats. Appropriate security mechanisms are thus needed to protect the LAN resources from wireless intruders.

Accordingly, techniques for improving security for local area network environments are highly desirable.

BRIEF SUMMARY OF THE INVENTION

According to the present invention, techniques directed to wireless computer networking are provided. More particularly, the invention provides a method and a system for providing intrusion detection for local area wireless networks. Merely by way of example, the invention has been applied to a computer networking environment based upon the IEEE 802.11 family of standards, commonly called "WiFi." But it would be recognized that the invention has a much broader range of applicability. For example, the invention can be applied to UWB, WiMAX (802.16), Bluetooth, and others.

In a specific embodiment, the present invention provides a method for monitoring a wireless communication space (e.g., office space, home, apartments, government buildings, warehouses, hot-spots, commercial facilities etc.) occupied by one or more computer networks. The method includes monitoring a selected local geographic region using one or more sniffer devices. Each of the sniffer devices is spatially disposed within the selected local geographic region and/or within a vicinity of the selected local region. The selected local geographic region is occupied by connection points to a local area computer network, e.g., Ethernet, wireless LAN, and IP. The method includes initiating a wireless activity. The method also includes detecting the wireless activity within the selected local geographic region using at least one of the sniffer devices from the one or more sniffer devices. According to a specific embodiment, the wireless activity is derived from at least one authorized device, at least one unauthorized device, or at least one external device. The method includes receiving identity information (e.g., source information, destination information, MAC address) associated with the wireless activity in a classification process and labeling the identity information into at least one of a plurality of categories. The method includes transferring an indication associated with the identify information to a prevention process.

In an alternative specific embodiment, the present invention provides a method for monitoring a wireless communication space occupied by one or more computer networks using one or more marker packets. The method includes monitoring a selected local geographic region using one or more sniffer devices. Each of the sniffer devices is spatially disposed within the selected local geographic region, the selected local geographic region occupied by connection points to a local area computer network. The method includes providing a marker packet from an originating device, which is coupled to the local area computer network. Preferably, the originating device can include a server, a computer system, a sniffer, or any combination of these, and the like. The method includes transferring the marker packet through the local area network to an access point. If said access point is coupled to the local area network, the method outputs the marker packet from the access point to a wireless medium and captures a wireless activity (e.g., information associated with the wireless activity) associated with the marker packet within the selected local area using at least one of the sniffer devices. The method includes processing the wireless activity to identify the marker packet and determining identity information associated with the wireless activity associated with the marker packet. One the other hand, if said access point is not coupled to the local area network, the access point does not receive the marker packet transferred through the local area network and consequently the marker packet is not output to the wireless medium. Then the wireless activity associated with the marker packet cannot be detected on the wireless medium by any of the sniffer devices.

In yet an alternative specific embodiment, the invention provides an automated system (e.g., fully-automated) for monitoring a wireless communication space occupied by one or more computer networks. The system comprises one or more sniffer devices adapted to monitor a selected local geographic region. Each of the sniffer devices is spatially disposed within the selected local geographic region, which is occupied by connection points to a local area computer network. The system has one or more computer executable codes in one or more memories in preferred embodiments. A code is directed to perform a process for detection of a wireless activity within the selected local geographic region using at least one of the sniffer devices from the one or more sniffer devices. Preferably, the wireless activity is derived from at least one authorized device, or at least one unauthorized device, or at least one external device, or other like devices. A code is directed to receiving identity information associated with the wireless activity from the detection process in a classification process and a code is directed to labeling the identity information into at least one of a plurality of categories in the classification process. According to a preferred embodiment, the system also has a code directed to transferring an indication associated with the identify information to a prevention process.

In yet a further alternative specific embodiment, the present invention provides computer based system for monitoring a wireless communication space using one or more marker packets occupied by one or more computer networks. The system has one or more sniffer devices adapted to monitor a selected local geographic region. Each of the sniffer devices is spatially disposed within the selected local geographic region. The selected local geographic region is occupied by connection points to a local area computer network. The system also has one or more computer memories storing one or more computer executable codes. One or more codes is directed to providing a marker packet from an originating device, which is coupled to the local area computer network. One or more codes is directed to transferring the marker packet through the local area network to an access point, which is coupled to the local area network. One or more codes is directed to outputting the marker packet from the access point to a wireless medium. One or more codes is directed to receiving a wireless activity information associated with the marker packet within the selected local area using at least one of the sniffer devices. One or more codes is directed to processing the wireless activity information associated with the marker packet to identify the marker packet and one or more codes is directed to determining identity information associated with the wireless activity associated with the marker packet. Depending upon the embodiments, there may be other codes or combination of codes, which may be in software, firmware, and/or hardware, to carry out other functionality described herein and outside of the present specification.

According to an alternative embodiment of the present invention, the wireless activity in a geographic area containing LAN connection ports is monitored using one or more sniffers. By analyzing said wireless activity, one or more APs that are operating in said geographic area are identified. The active APs so identified are automatically classified into three categories, namely "authorized" APs (those that are allowed by network administrator), "unauthorized" APs (those that are not allowed by the network administrator, but are still connected to the LAN of interest) and "external" APs (those that are not allowed by network administrator but are not connected to the LAN of interest, for example APs connected to the neighbor's LAN). The sniffers continue to monitor the selected geographic area to detect any wireless station attempting to connect to or communicating with the one or more identified unauthorized APs. When the presence of unauthorized AP is detected and/or the presence of intruding wireless station is detected, an intrusion alert is generated and actions are taken to disable or disrupt any communication between unauthorized AP and intruding wireless station.

In yet an alternative embodiment, one or more tests are performed to identify if a given AP is connected to the LAN of interest. In one embodiment of the LAN connectivity test, a packet called marker packet is transmitted to the AP through the LAN. The AP, if indeed connected to the LAN, in turn transmits the marker packet onto the wireless medium. When the sniffer detects the transmission of the marker packet by the AP on the wireless medium, said AP is identified as connected to the LAN of interest.

In another embodiment of the LAN connectivity test, a marker packet is transmitted by the sniffer to the AP over a wireless medium. The marker packet is addressed to a destination address. If the AP is indeed connected to the LAN, it transfers the marker packet to the LAN and the marker packet is finally received at the destination address. The information about the identity of the AP to which the marker packet is transmitted by the sniffer and the fact that said marker packet is received at the destination address are used to infer that said AP is connected to the LAN.

In another alternative embodiment, one or more tests are performed to identify if a given AP is an authorized AP. In a specific embodiment, these tests are directed to compare the feature set of an AP derived from the observations made by one or more sniffers with the feature set known to be of the authorized APs. The sniffers perform passive monitoring and/or active probing to capture the AP behavior which in turn is used in determining its feature set.

In yet an alternative embodiment, the present invention provides a method for monitoring a wireless communication space using one or more marker packets occupied by one or more computer networks. The method includes monitoring a selected local geographic region using one or more sniffer devices. Each of the sniffer devices is spatially disposed within the selected local geographic region, which is occupied by one or more connection points to a local area computer network. The method includes detecting a wireless activity associated with a trigger packet within the selected local geographic region using at least one of the sniffer devices from the one or more sniffer devices and providing a marker packet based upon at least information from the trigger packet from an originating device, which is coupled to the local area computer network. The method includes transferring the marker packet through the local area network to an access point and outputting the marker packet from the access point to a wireless medium. The method also includes capturing a wireless activity associated with the marker packet within the selected local geographic region using at least one of the sniffer devices from the one or more sniffer devices and processing the wireless activity associated with the marker packet to identify the marker packet. The method includes determining identity information associated with the wireless activity associated with the marker packet and/or trigger packet.

In an alternative specific embodiment, the present invention provides a method for testing connectivity of a wireless communication space using one or more marker packets occupied by one or more computer networks. The method includes providing a marker packet from an originating device, which is coupled to the local area computer network. Preferably, the local area network being within a selected local geographic region, which includes one or more sniffer devices, which are spatially disposed within the selected local geographic region. The selected local geographic region is occupied by one or more connection points to the local area computer network. The method includes transferring the marker packet through the local area network to one or more access point, which may or may not be connected to the local area network. The method includes outputting the marker packet from the one or more access point only if the one or more access points are connected to the local area computer networks and capturing a wireless activity associated with the marker packet within the selected local area using at least one of the sniffer devices. Preferably, the method processes the wireless activity to identify the marker packet and determines identity information associated with the wireless activity associated with the marker packet.

Certain advantages and/or benefits may be achieved using the present invention. For example, the present technique provides an easy to use process that relies upon conventional computer hardware and software technologies. In some embodiments, the method and system are fully automated and can be used to prevent unauthorized wireless access of local area computer networks. The automated operation minimizes the human effort required during the system operation and improves the system response time and accuracy. In some embodiments, the method and system advantageously reduce or eliminate the false positives on intrusion events thereby eliminating the nuisance factor during the system operation. This is because the technique of the invention intelligently distinguishes between unauthorized APs and external APs, the latter usually being the source of false positives. According to specific embodiments, the method and system of invention provide alternatives of client-server implementation or standalone appliance implementation thereby providing intrusion detection solution to suit the cost, the network size and the management effort requirements. Additionally, the invention is compatible with conventional wireless and wired networking technologies without substantial modifications to conventional equipment and processes according to a specific embodiment. Depending upon the embodiment, one or more of these benefits may be achieved. These and other benefits will be described in more throughout the present specification and more particularly below.

Other features and advantages of the invention will become apparent through the following detailed description, the drawings, and the claims.

DETAILED DESCRIPTION OF THE INVENTION

According to the present invention, techniques for wireless computer networking are provided. More particularly, the invention provides a method and a system for providing intrusion detection for local area wireless networks. Merely by way of example, the invention has been applied to a computer networking environment based upon the IEEE 802.11 family of standards, commonly called "WiFi." But it would be recognized that the invention has a much broader range of applicability. For example, the invention can be applied to UWB, WiMAX (802.16), Bluetooth, and others.

Figure 1:
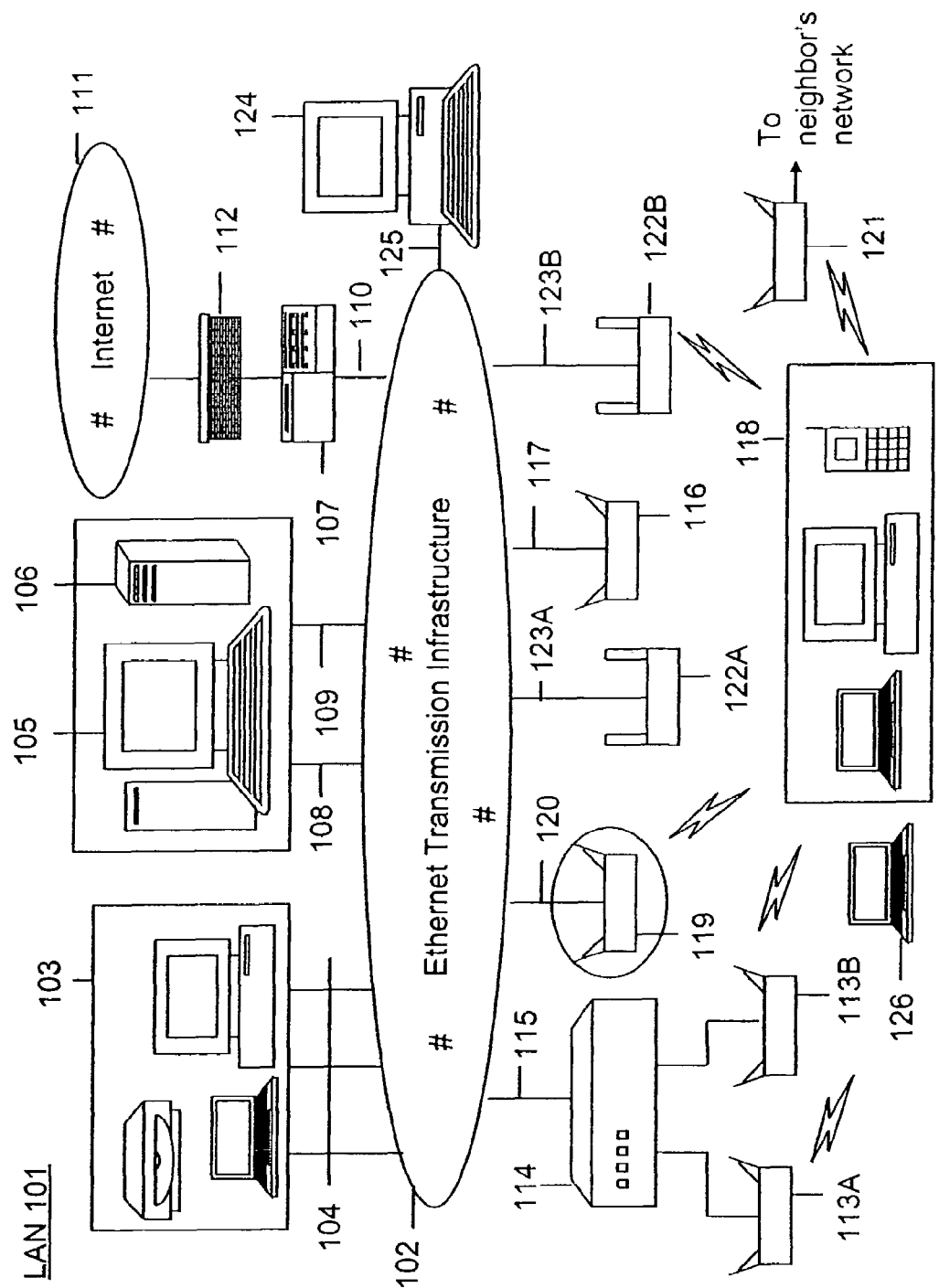
FIG. 1 shows a simplified LAN architecture that supports wireless intrusion detection according to an embodiment of the present invention.

FIG. 1 shows the LAN architecture that supports the intrusion detection according to one embodiment of the invention. This diagram is merely an example, which should not unduly limit the scope of the claims herein. One of ordinary skill in the art would recognize other variations, modifications, and alternatives. As shown in FIG. 1, the core transmission infrastructure 102 for the LAN 101 comprises of Ethernet cables, hubs and switches. Other devices may also be included. Plurality of connection ports (e.g., Ethernet ports) are provided for the various computer systems to be able to connect to the LAN. One or more end user devices 103 such as desktop computers, notebook computers, telemetry sensors etc. are connected to the LAN 101 via one or more connection ports 104 using wires (Ethernet cable) or other suitable devices. Other computer systems that provide specific functionalities and services are also connected to the LAN. For example, one or more database computers 105 may be connected to the LAN via one or more connection ports 108. Examples of information stored in database computers include customer accounts, inventory, employee accounts, financial information etc. One or more server computers 106 may be connected to the LAN via one or more connection ports 109. Examples of services provided by server computers include database access, email storage, HTTP proxy service, DHCP service, SIP service, authentication, network management etc. The router 107 is connected to the LAN via connection port 110 and it acts as a gateway between the LAN 101 and the Internet 111. The firewall/VPN gateway 112 protects computers in the LAN against hacking attacks from the Internet 111. It may additionally also enable remote secure access to the LAN.

WiFi is used to provide wireless extension of the LAN. For this, one or more authorized WiFi APs 113A, 113B are connected to the LAN via WiFi switch 114. The WiFi switch is connected to the LAN connection port 115. The WiFi switch enables offloading from APs some of the complex procedures for authentication, encryption, QoS, mobility, firewall etc., and also provides centralized management functionality for APs. One or more authorized WiFi AP 116 may also be directly connected to the LAN connection port 117. In this case AP 116 may itself perform necessary security procedures such as authentication, encryption, firewall, etc. One or more end user devices 118 such as desktop computers, laptop computers, handheld computers (PDAs) equipped with WiFi radio can now wirelessly connect to the LAN via authorized APs 113A, 113B and 116. Although WiFi has been provided according to the present embodiment, there can also be other types of wireless network formats such as UWB, WiMax, Bluetooth, and others.

One or more unauthorized APs can be connected to the LAN. The figure shows unauthorized AP 119 connected to the LAN connection port 120. The unauthorized AP may not employ the right security policies. Also traffic through this AP may bypass security policy enforcing elements such as, for example, WiFi switch 114. The AP 119 thus poses a security threat as intruders such as wireless station 126 can connect to the LAN and launch variety of attacks through this AP. According to a specific embodiment, the unauthorized AP can be a rogue AP, a misconfigured AP, a soft AP, and the like. A rogue AP can be an AP such as for example openly available in the market that is brought in by the person having physical access to the facility and connected to the LAN via the LAN connection port without the permission of the network administrator. A misconfigured AP can be the AP otherwise allowed by the network administrator, but whose security parameters are, usually inadvertently, incorrectly configured. Such an AP can thus allow wireless intruders to connect to it. Soft AP is usually a "WiFi" enabled computer system connected to the LAN connection port that also functions as an AP under the control of software. The software is either deliberately run on the computer system or inadvertently in the form of a virus program.

The figure also shows neighbor's AP 121 whose radio coverage spills into the area covered by LAN. The AP 121 is however not connected to the concerned LAN 101 and is harmless from the intrusion standpoint. According to a specific embodiment, the neighbor's AP can be an AP in the neighboring office, an AP is the laboratory not connected to the concerned LAN but used for standalone development or experimentation, an AP on the street providing free "WiFi" access to passersby and other APs, which co-exist with the LAN and share the airspace without any significant and/or harmful interferences.

A WiFi AP delivers data packets between the wired LAN and the wireless transmission medium. Typically, the AP performs this function either by acting as a layer 2 bridge or as a network address translator (NAT). The layer 2 bridge type AP simply transmits the Ethernet packet received on its wired interface to the wireless link after translating it to 802.11 style packet and vice versa. The NAT AP on the other hand acts as a layer 3 (IP) router that routes IP packets received on its wired interface to the stations connected to its wireless interface and vice versa. The wired side and wireless side interfaces of the NAT AP thus usually reside on different subnets.

The intrusion detection system according to the present invention is provided to protect the LAN 101 from unauthorized APs and/or wireless intruders. The system involves one or more sensor devices 122A, 122B (i.e., sniffers) placed throughout a geographic region or a portion of geographic region including the connection points to the LAN 101. The sniffer is able to monitor the wireless activity in the selected geographic region. For example, the sniffer listens to the radio channel and captures packets being transmitted on the channel. The sniffer cycles through the radio channels on which wireless communication can take place. On each radio channel, it waits and listens for any ongoing transmission. In one embodiment, the sniffer is able to operate on a plurality of radio channels simultaneously. Whenever transmission is detected, the relevant information about that transmission is collected and recorded. This information comprises of all or a subset of information that can be gathered from various fields in the captured packet such as 802.11 MAC (medium access control) header, 802.2 LLC (i.e., logical link control) header, IP header, transport protocol (e.g., TCP, UDP, HTTP, RTP etc.) headers, packet size, packet payload and other fields. Receive signal strength (i.e., RSSI) may also be recorded. Other information such as the day and the time of the day when said transmission was detected may also be recorded.

According to a specific embodiment, the sniffer device can be any suitable receiving/transmitting device capable of detecting wireless activity. As merely an example, the sniffer often has a smaller form factor. The sniffer device has a processor, a flash memory (where the software code for sniffer functionality resides), a RAM, two 802.11a/b/g wireless network interface cards (NICs), one Ethernet port (with optional power over Ethernet or POE), a serial port, a power input port, a pair of dual-band (2.4 GHz and 5 GHz) antennas, and at least one status indicator light emitting diode. The sniffer can be built using the hardware platform similar to one used to build wireless access point, although functionality and software will be different for the sniffer device. Of course, one of ordinary skill in the art would recognize other variations, modifications, and alternatives. Further details of the sniffers are provided throughout the present specification and more particularly below.

One or more sniffers 122A and 122B may also be provided with radio transmit interface. The radio transmit interface is used to transmit packets on the wireless medium. As an example the transmitted packets can be marker packets, probe packets, packets directed to perform intrusion prevention, and the like. In one specific embodiment, the sniffer is a dual slot device which has two wireless NICs. These NICs can be used in a variety of combinations, for example both for monitoring, both form transmitting, one for monitoring and the other for transmitting etc., under the control of software. In another specific embodiment, the sniffer has only one wireless NIC. The same NIC is shared in a time division multiplexed fashion to carry out monitoring as well as defense against intrusion. Each sniffer 122A, 122B is also connected to the LAN via the connection ports 123A, 123B.

The sniffers can be spatially disposed at appropriate locations in the geographic area to be monitored for intrusion by using one or more of heuristics, strategy and calculated guess. Alternatively, a more systematic approach using an RF (radio frequency) planning tool is used to determine physical locations where said sniffers need to be deployed according to an alternative embodiment of the present invention.

One or more data collection servers 124 are connected to the LAN connection ports 125. Each sniffer conveys information about the detected wireless transmission to data collection server for analysis, storage, processing and rendering. The sniffer may filter and/or summarize the information before conveying it to the data collection server. The sniffer receives configuration information from the data collection server. It may also receive specific instructions form the server as regards tuning to specific radio channel, detecting transmission of specific packet on the radio channel, launching defense against intrusion etc. In a preferred embodiment, the sniffer connects to the data collection server over the LAN through the wired connection port. In an alternate embodiment, the sniffer connects to the data collection server over the LAN through the wireless connection.

In a specific embodiment, the sniffer device captures wireless activity. Such wireless activity includes, among others, transmission of control, management or data packet between an AP and a wireless station or among wireless stations, and communication for establishing wireless connection between an AP and a wireless station often called association. Additionally, the configuration information from the data collection server includes, among others, the operating system software code and the operation parameters such as frequency spectrum and radio channels to be scanned, types of wireless activities to be detected etc. Depending upon the embodiment, the invention also provides certain methods for monitoring wireless activity in selected geographic regions.

According to a specific embodiment, the present invention provides a method for monitoring a wireless communication space (e.g., office space, home, apartments, government buildings, warehouses, hot-spots, commercial facilities etc.) occupied by one or more computer networks which may be outlined as follows.

1. Provide a geographic region;

2. Operate a local area network in a selected portion of the geographic region;

3. Monitor a selected local geographic region in the geographic region using one or more sniffer devices;

4. Detect a wireless activity from at least one authorized device, or at least one unauthorized device, or at least one external device, within the selected local geographic region using at least one of the sniffer devices from the one or more sniffer devices;

5. Receive at least identity information (e.g., source information, destination information, MAC address) associated with the wireless activity in a classification process;

6. Label the identity information into at least one of a plurality of categories;

7. Transfer an indication associated with the identify information to a prevention process; and 8. Perform other steps, as desired.

The above sequence of steps provides methods according to an embodiment of the present invention. As shown, the method uses a combination of steps including a way of detecting for an intrusion in the wireless computer networks. In preferred embodiments, the present invention also includes an automated method for transferring an indication of an intrusion to a prevention process, which would preferably stop the intruding device before any security problems or the like. Many other methods and system are also included. Of course, other alternatives can also be provided where steps are added, one or more steps are removed, or one or more steps are provided in a different sequence without departing from the scope of the claims herein. Additionally, the various methods can be implemented using a computer code or codes in software, firmware, hardware, or any combination of these. Depending upon the embodiment, there can be other variations, modifications, and alternatives. Further details of the present method can be found throughout the present specification and more particularly below.

Figure 1A:
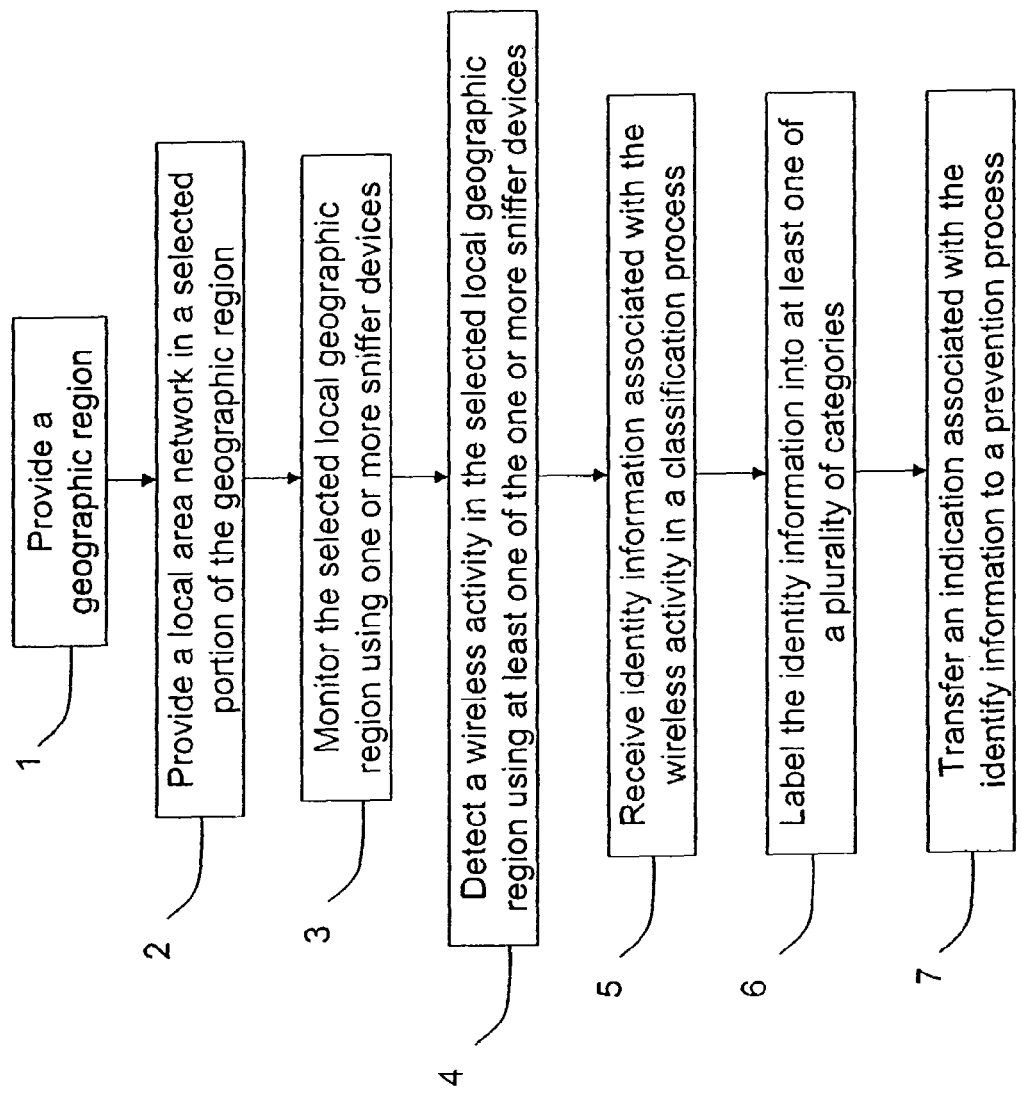
FIG. 1A illustrates a simplified flow diagram of an intrusion detection method according to an embodiment of the present invention.

FIG. 1A illustrates a simplified flow diagram of an intrusion detection method according to an embodiment of the present invention. This diagram is merely an example, which should not unduly limit the scope of the claims herein. One of ordinary skill in the art would recognize other variations, modifications, and alternatives. As shown, the present invention provides a method for monitoring a wireless communication space (e.g., office space, home, apartments, government buildings, warehouses, hot-spots, commercial facilities etc.) occupied by one or more computer networks, e.g., wired, wireless. As shown, the method includes providing a geographic region, step 1. According to a specific embodiment, the geographic region can be within a building, outside of a building, or a combination of these. As an example, the region can be provided in an office space, home, apartments, government buildings, warehouses, hot-spots, commercial facilities, etc. The method includes operating a local area network in a selected portion of the geographic region. The local area network (step 2) is commonly an Ethernet based network for private use and may be for public use or any combination of these.

In a specific embodiment, the method monitors (step 3) a selected local geographic region in the geographic region using one or more sniffer devices. The method includes detecting (step 4) a wireless activity from at least one authorized device, or at least one unauthorized device, or at least one external device, within the selected local geographic region using at least one of the sniffer devices from the one or more sniffer devices. Preferably, the unauthorized device is one that is physically connected to the network but does not belong to the network. That is, the unauthorized device has intruded the network according to preferred embodiments.

The method includes receiving (step 5) at least identity information (e.g., source information, destination information, MAC address) associated with the wireless activity in a classification process. The method also includes labeling (step 6) the identity information into at least one of a plurality of categories, e.g., authorized, not authorized, external, connected, not connected, and any combination of these. Of course, one of ordinary skill in the art would recognize variations, modifications, and alternatives.

According to a specific embodiment, the method transfers (step 7) an indication associated with the identify information to a prevention process. As merely an example, once the unauthorized access point has been detected, the method sends an indication of the unauthorized access point to the prevention process. Preferably, the indication is sent almost immediately or before the transmission of one or more packets to or from the unauthorized access point, which is virtually instantaneously. Depending upon the embodiment, the method sends the indication via an inter process signal between various processes, which can be provided in computer codes. Alternatively, the method performs a selected function within the same process code to implement the prevention process. Certain details of the prevention process can be found throughout the present specification and more particularly below. Depending upon the embodiment, the method can perform other steps, as desired.

The above sequence of steps provides methods according to an embodiment of the present invention. As shown, the method uses a combination of steps including a way of detecting for an intrusion using wireless computer networks. In preferred embodiments, the present invention also includes an automated method for transferring an indication of an intrusion to a prevention process, which would preferably stop the intruding device before any security problems or the like. Many other methods and system are also included. Of course, other alternatives can also be provided where steps are added, one or more steps are removed, or one or more steps are provided in a different sequence without departing from the scope of the claims herein. Additionally, the various methods can be implemented using a computer code or codes in software, firmware, hardware, or any combination of these. Depending upon the embodiment, there can be other variations, modifications, and alternatives.

Figure 2:
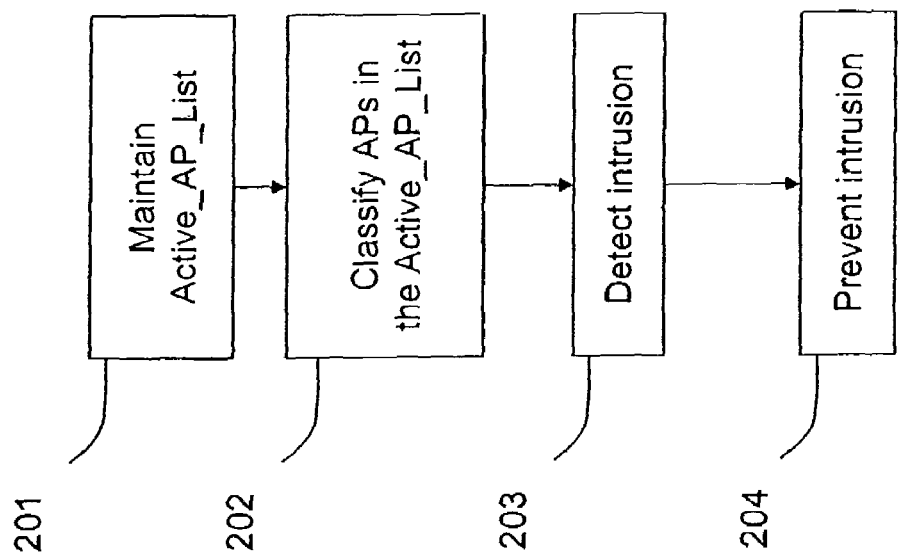
FIG. 2 shows a simplified logical flow of steps according to a method of an embodiment of the present invention.
Figure 3:
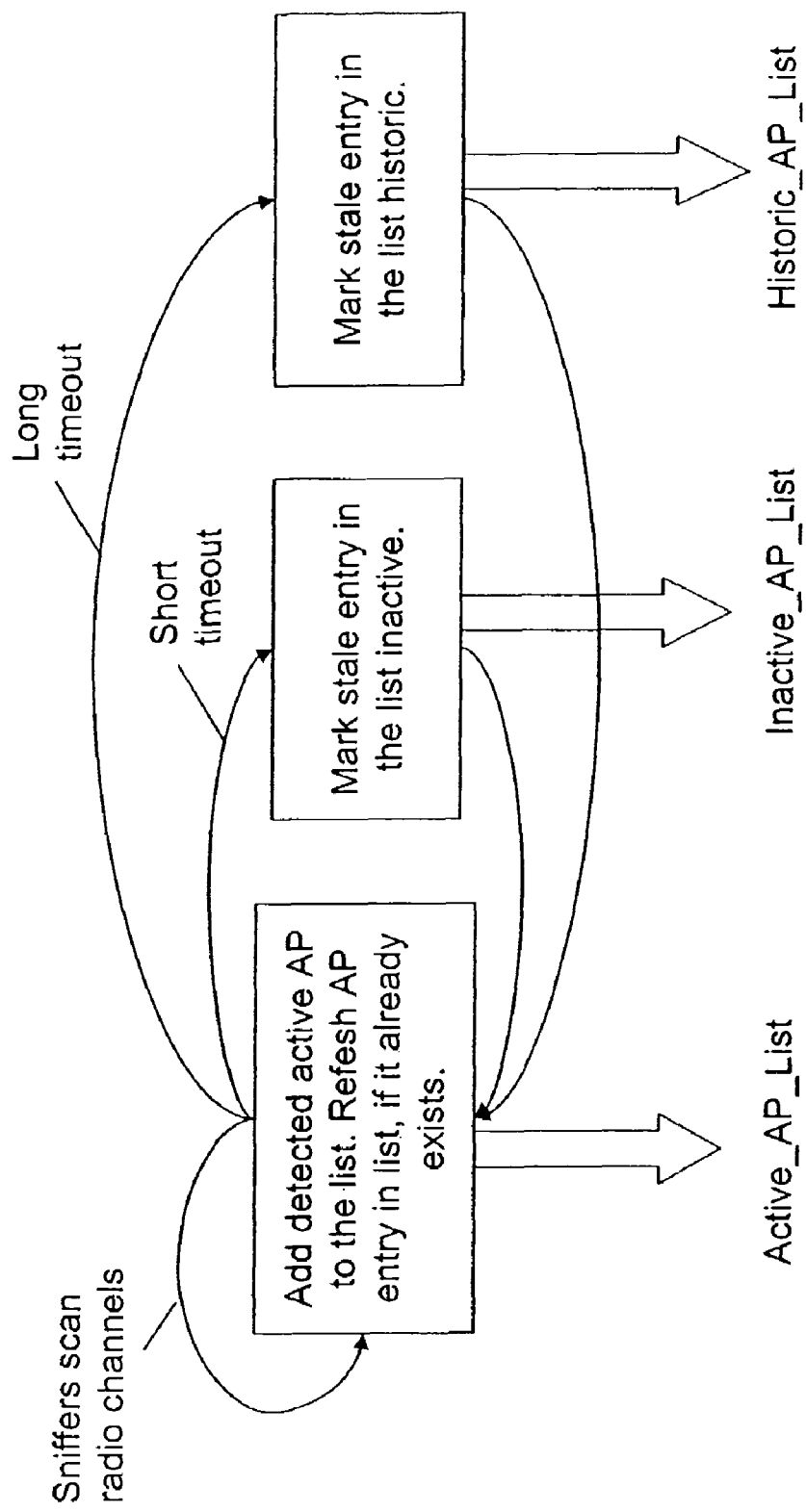
FIG. 3 shows a simplified logical flow of steps for maintaining the list of active APs according to an embodiment of the present invention.

FIG. 2 shows the logical flow of steps for wireless intrusion detection according to the method of the invention. This diagram is merely an example, which should not unduly limit the scope of the claims herein. One of ordinary skill in the art would recognize other variations, modifications, and alternatives. As shown, the first step 201 is to maintain the list of active APs called the Active_AP_List. An active AP is defined as the AP that was recently involved in the wireless transmission as the sender or the receiver. An active AP can be detected by analyzing the wireless transmission on the radio channel captured by the sniffer. For example, every AP in the WiFi network periodically transmits a beacon packet for the client wireless stations to be able to connect to it. The beacon packet contains information such as clock synchronization data, AP's MAC address (BSSID), supported data rates, service set identifiers (SSIDs), parameters for the contention and contention-free access to the wireless medium, capabilities as regards QoS, security policy etc. In one embodiment, detection of beacon packet transmission from an AP is used to identify said AP to be an active AP. Beacon packet can be recognized from the type and subtype fields in the 802.11 MAC header of the beacon packet. In alternate embodiments, active AP can also be detected when any other wireless transmission (data, control or management packet) directed to or generating from it is observed by the sniffer. Whenever an active AP is detected, it is added to the Active_AP_List. If the Active_AP_List already contains entry for said AP, the corresponding entry is refreshed. Associated with each entry in the Active_AP_List are a short timeout and a long timeout values. After a short timeout, the corresponding entry is marked "inactive" and after a long timeout it is marked "historic". The logical flow of steps for maintaining the Active_AP_List is shown in FIG. 3. This diagram is merely an example, which should not unduly limit the scope of the claims herein. One of ordinary skill in the art would recognize other variations, modifications, and alternatives.

The second step 202 is to classify the APs in Active_AP_List into at least three categories, namely "authorized", "unauthorized" and "external". The authorized APs are defined to be the APs which are allowed to be connected to the LAN by the network administrator. The unauthorized APs are defined to be the APs that are not allowed to be connected to the LAN, but are still connected to the LAN. The unauthorized APs pose a security threat. The external APs are defined to be the APs whose active presence can be detected by the sniffers but they are not connected to the LAN. For example, these can be neighbor's APs whose radio coverage spills into the physical space of interest. The external APs do not pose a security threat. One or more tests are performed to classify APs in the Active_AP_List into these categories.

The third step 203 is intrusion detection. When an unauthorized AP is detected, intrusion alert is generated. Whenever any wireless station attempting connection to or connected to unauthorized AP is detected, intrusion alert is generated. Once the intrusion alert is generated, the method sends an indication of the AP and/or intruding wireless station to a prevention process. Preferably, the indication is sent almost immediately or before the transmission of one or few more packets by intruders. Depending upon the embodiment, the method sends the indication via an inter process signal between various processes, which can be provided in computer codes. Alternatively, the method performs a selected function within the same process code to implement the prevention process. Further details of the prevention process can be found throughout the present specification and more particularly below.

The fourth step 204 is intrusion prevention wherein subsequent to intrusion alert; action is taken to disable or disrupt any communication between unauthorized AP and intruding wireless station. One embodiment of this step works by preventing or breaking the "association" between unauthorized AP and intruding wireless station. Association is the procedure defined in 802.11 standard wherein the wireless station and the AP establish a wireless connection between them. Techniques for preventing or breaking the association include but are not limited to sending one or more spoofed "deauthentication" packets from one or more sniffers with AP's MAC address as source address with a reason code "Authentication Expired" to a particular intruding wireless station or to a broadcast address, sending one or more spoofed De-Authentication packets from one or more sniffers to unauthorized AP with intruding wireless station's MAC address as source address with reason code "Auth Leave", sending one or more spoofed "disassociation" packets from one or more sniffers with AP's MAC address as source address to a particular intruding wireless station or to a broadcast address and sending one or more spoofed disassociation packets from one or more sniffers to unauthorized AP with intruding wireless station's MAC address as source address. Another embodiment of this step involves continuously sending frames from one or more sniffers with BSSID field containing MAC address of unauthorized AP and a high value in network allocation vector (NAV) field. All client wireless stations of said AP including said intruding wireless station then defer access to radio channel for the duration specified in NAV field. This causes disruption to the communication between said AP and said intruding wireless station. A number of other embodiments such as inflicting acknowledgement (ACK) or packet collisions via transmissions from the sniffer, destabilizing or desynchronizing the wireless stations within the BSS (basic service set) of unauthorized AP by sending confusing beacon frames from the sniffer can also be used.

Figure 4:
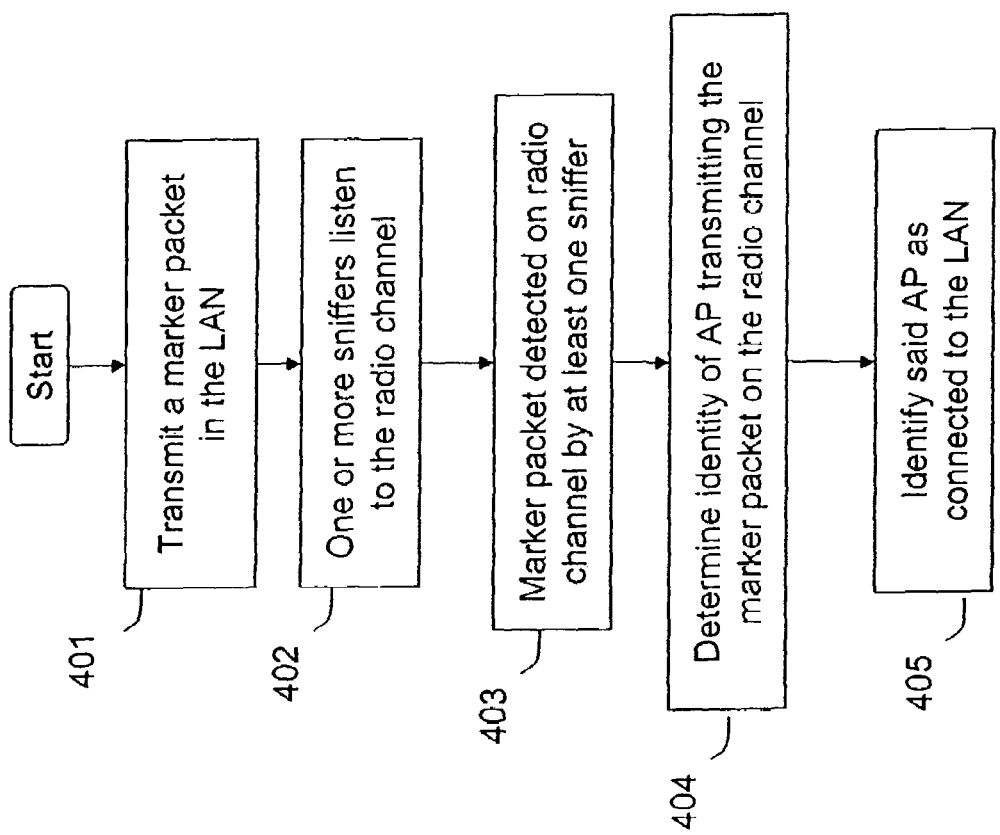
FIG. 4 shows a simplified logical flow of steps in an embodiment of the LAN connectivity test according to the present invention.

In the preferred embodiment of the method of invention, in step 202 a test called the "LAN connectivity test" is used to distinguish the APs in the Active_AP_List that are connected to the LAN (e.g., authorized or unauthorized) from those that are not connected to the LAN (e.g., external). The logical flow of steps according to an embodiment of the LAN connectivity test is shown in FIG. 4. This diagram is merely an example, which should not unduly limit the scope of the claims herein. One of ordinary skill in the art would recognize other variations, modifications, and alternatives. As shown in step 401, one or more marker packets are transmitted to the LAN by the originating device. The originating device can be a sniffer, a data collection server or any computer system whose transmission can reach the concerned LAN over one or more computer networks. For example, the sniffer or the data collection server can transmit the marker packet to the concerned LAN via the Ethernet port. The marker packet has a peculiar format using which it can later be identified by the intrusion detection system. The format can be different for different marker packets. The marker packet may contain a sequence number using which it can later be compared against the known marker packets. The marker packet may contain identity of the originating device. The marker packet is received by all or a subset of APs connected to the concerned LAN and transmitted by all or a subset of them on the wireless medium.

In step 402, one or more sniffers listen to one or more radio channels on which wireless communication can take place.

In step 403, preferably at least one sniffer detects the transmission of at least one marker packet on the radio channel. The marker packet is detected by analyzing the format of the captured packet. If the AP transmits marker packet on the radio channel without modifying it via encryption procedure all the format information in the detected packet is available to the intrusion detection system for analysis for identifying marker packet. If the AP transmits marker packet on the radio channel after modifying it via encryption procedure the intrusion detection system may not be able to analyze all the format information in the detected packet. In this case, certain features of the packet format that are unaffected by encryption procedure are used for analysis. For example, the encryption procedure does not change the size of the data being encrypted. Thus the size of detected packets can be used as a format parameter to identify said packet as the marker packet.

Then in step 404 the identity of the AP that transmits the marker packet is determined from the 802.11 MAC header (for example from the transmitter address or BSSID fields) of the packet transmitted on the radio channel.

In step 405, the AP that transmits the marker packet is declared to be connected to the LAN. In a preferred embodiment, the corresponding entry in the Active_AP_List is marked as "connected to the LAN".

In one embodiment of the above method, the marker packet is an Ethernet style packet addressed to the broadcast address, i.e., the value of hexadecimal ff:ff:ff:ff:ff:ff in the destination address field of Ethernet MAC header. This packet will be received by all APs that are connected in the LAN broadcast domain. The APs among these acting as layer 2 bridges then transmit this broadcast packet on the wireless medium after translating it to the 802.11 style packet.

In alternate embodiment, the marker packet is an Ethernet style unicast packet addressed to the MAC address of a wireless station associated with an AP. Said MAC address is inferred by analyzing the prior communication between said wireless station and said AP that is captured by one or more sniffers. This packet will be received by said AP if it is connected to the concerned LAN. Said AP acting as layer 2 bridge then transmits the marker packet on the wireless medium after translating it to the 802.11 style packet.

In another alternate embodiment, the marker packet is an IP packet addressed to the IP address of a wireless station associated with an AP. Said IP address is inferred by analyzing the prior communication between said wireless station and said AP that is captured by one or more sniffers. This packet will be received by said AP if it is connected to the concerned LAN and transmitted by said AP on the wireless medium after translating it to the 802.11 style packet.

In yet an alternate embodiment, the marker packet is an IP packet addressed to the broadcast IP address of the LAN.

In one embodiment, the marker packet is not actively injected in the LAN by the intrusion detection system. Rather, one or more broadcast/multicast/unicast packets from the data traffic on the LAN are used as marker packets. The logic being if an AP is connected to the same LAN as the sniffer, then at least the subset of the data traffic seen by the Ethernet port of the sniffer will be same as the data traffic captured by the sniffer on the radio channel. Thus the sniffer compares the packet captured on the radio channel with the packets transmitted over the wired LAN and captured by the sniffer's LAN connection port (Ethernet NIC) to identify a matching format.

The sniffer can detect the appearance of the marker packet on a specific radio channel only if the sniffer is tuned to said radio channel during the interval of transmission of the marker packet on said radio channel. It may thus be necessary to send marker packets in the LAN periodically and preferably at randomized intervals, so as to maximize the probability that at least one sniffer gets an opportunity to detect at least one marker packet transmitted by each AP connected to the LAN.

Figure 5:
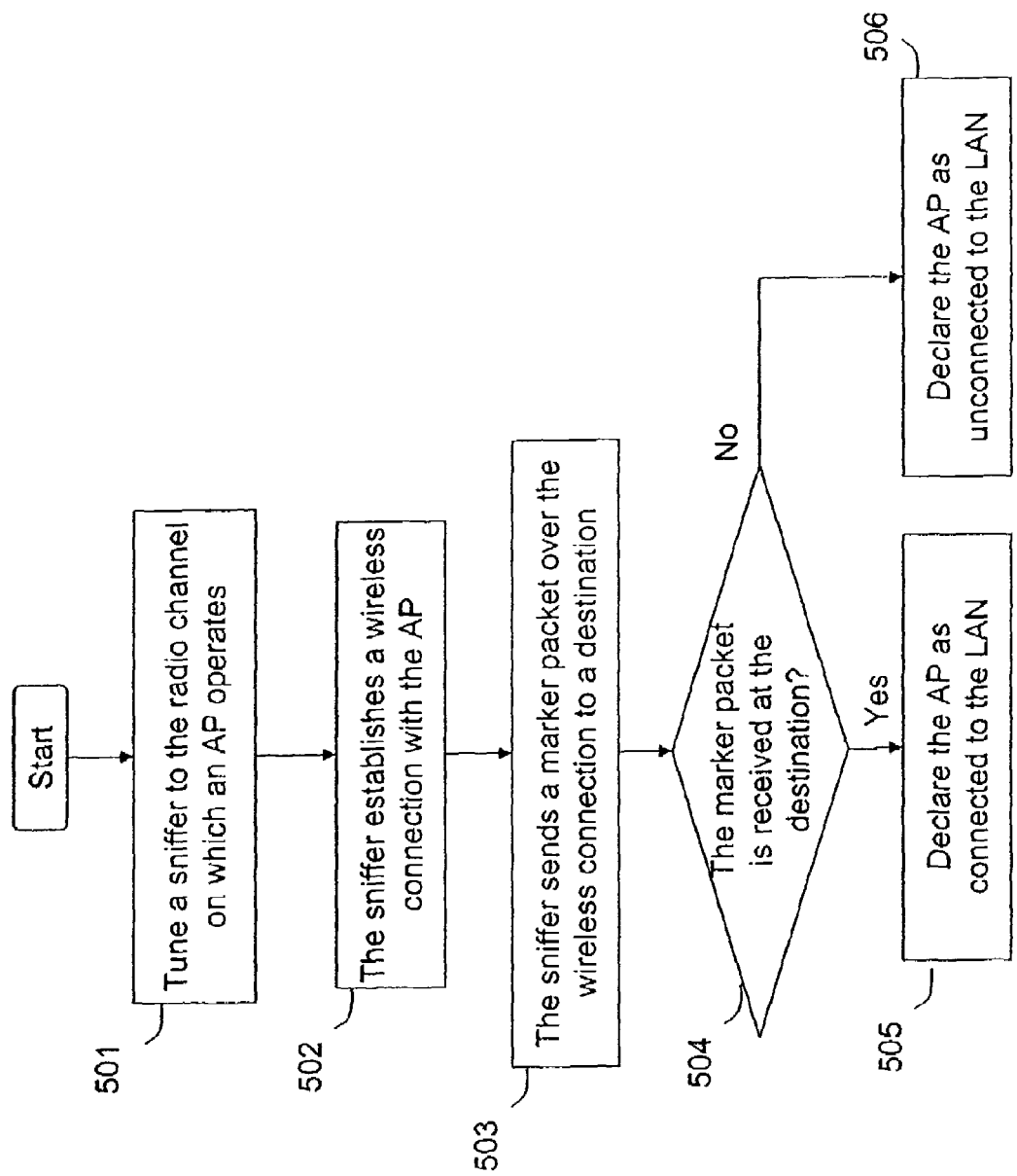
FIG. 5 shows a simplified logical flow of steps in another embodiment of the LAN connectivity test according to the present invention.

The logical flow of steps according to another embodiment of the LAN connectivity test is shown in FIG. 5. This diagram is merely an example, which should not unduly limit the scope of the claims herein. One of ordinary skill in the art would recognize other variations, modifications, and alternatives. This embodiment is particularly useful to detect unauthorized APs that implement NAT (i.e., network address translation) functionality unlike layer 2 bridge functionality though it is also useful for the latter. The test is also useful to detect unauthorized layer 2 bridge type APs (e.g., soft APs) that block forwarding of broadcast packets from the wired LAN onto the wireless medium so as to evade detection by previous embodiment of the LAN connectivity test.

In step 501, the sniffer is tuned to the radio channel on which an AP operates. In step 502, the sniffer establishes wireless connection with said AP. This typically involves listening to AP's beacon packet and subsequently performing "association" procedure with said AP as described in IEEE 802.11 standard. Subsequent to association, the parameters for IP connection are assigned to the radio interface of the sniffer. A preferred method to assign IP connection parameters is for the sniffer to perform DHCP (i.e., dynamic host configuration protocol) request/response transactions over the wireless connection established with AP. These parameters comprise at least of the IP address for the radio interface of the sniffer. The DHCP is described in RFC 2131 standard of the Internet Engineering Task Force (IETF).

In an alternate embodiment, in step 502 rather than establishing a new association with the AP, the sniffer reuses an existing association between the AP and a wireless station associated with the AP. For this, the sniffer detects the parameters of an existing association between the AP and the wireless station associated with the AP. The parameters include, among others, the MAC address of the associated wireless station. The sniffer may also determine the IP address and the TCP or UDP port number of the wireless station by monitoring the packets transmitted or received by the station.

In step 503, the sniffer sends one or more marker packets to the AP over the wireless connection newly established or already existing as applicable depending on the embodiment of step 502. The marker packet is addressed to the sniffer itself, the data collection server, another sniffer, any other network entity or a broadcast address. Various preferred embodiments for this step are now described.

In one embodiment of step 503, the marker packet is UDP (i.e., user datagram protocol) packet. UDP is the transport layer protocol used by computers in the IP network to exchange data. It is described in RFC 768 standard of the IETF. In a preferred embodiment, UDP marker packet has source IP address as the IP address of the radio interface of the sniffer. In an alternative embodiment wherein step 502 reuses existing association, preferably the UDP marker packet has the source IP address and the source UDP port number same as the corresponding values detected in the packets transmitted by the wireless station whose association is being reused by the sniffer. The destination IP address in the UDP packet can be the IP address of the wired (Ethernet) interface of the sniffer or the IP address of the data collection server.

In another embodiment of step 503, the marker packet is a TCP (i.e., transmission control protocol) packet. The TCP is a transport protocol described in RFC 793 standard of the IETF. It is used by computers in IP network for reliable exchange of data. In a preferred embodiment, TCP marker packet is TCP SYN packet. In alternate embodiment, it can be any packet in TCP format. In a preferred embodiment, TCP marker packet has source IP address as the IP address of the radio interface of the sniffer. In an alternative embodiment wherein step 502 reuses existing association, preferably the TCP marker packet has the source IP address and the source TCP port number same as the corresponding values detected in the packets transmitted by the wireless station whose association is being reused by the sniffer. The destination IP address in the TCP packet can be the IP address of the wired (e.g., Ethernet) interface of said sniffer or the IP address of the data collection server.

In yet another embodiment of step 503, the marker packet is any layer 2 style frame. In a preferred embodiment, the source address in said layer 2 frame is the MAC address of the radio interface of the sniffer. In an alternative embodiment wherein step 502 reuses existing association, preferably the source address in the layer 2 frame is the MAC address of the wireless station whose association is being reused by the sniffer. The destination address in the layer 2 frame is the MAC address of the wired (e.g., Ethernet) interface of the sniffer or the MAC address of the wired interface of data collection server.

In yet another embodiment of step 503, the marker packet is addressed to the broadcast address. If the sniffer detects that the IP address assigned to its radio interface is in the domain of addresses assigned to the wired LAN, the marker packet can be addressed to IP broadcast address in said domain of addresses. The IP broadcast address is constructed by using all binary ones in the host address part and using the network number of said wired LAN in the network address part of the IP address. Alternatively, layer 2 format marker packet can be addressed to the MAC broadcast address, which is hexadecimal ff:ff:ff:ff:ff:ff.

If said AP is indeed connected to the LAN, it will forward marker packet from the wireless connection to the LAN and thus the marker packet will be received at destination in step 504.

Subsequently, said AP is declared to be connected to the LAN in step 505. Alternatively, if the AP is not connected to the LAN, the marker packet will not be received at the destination and said AP is then declared unconnected to the LAN in step 506 according to a specific embodiment.

Figure 6:
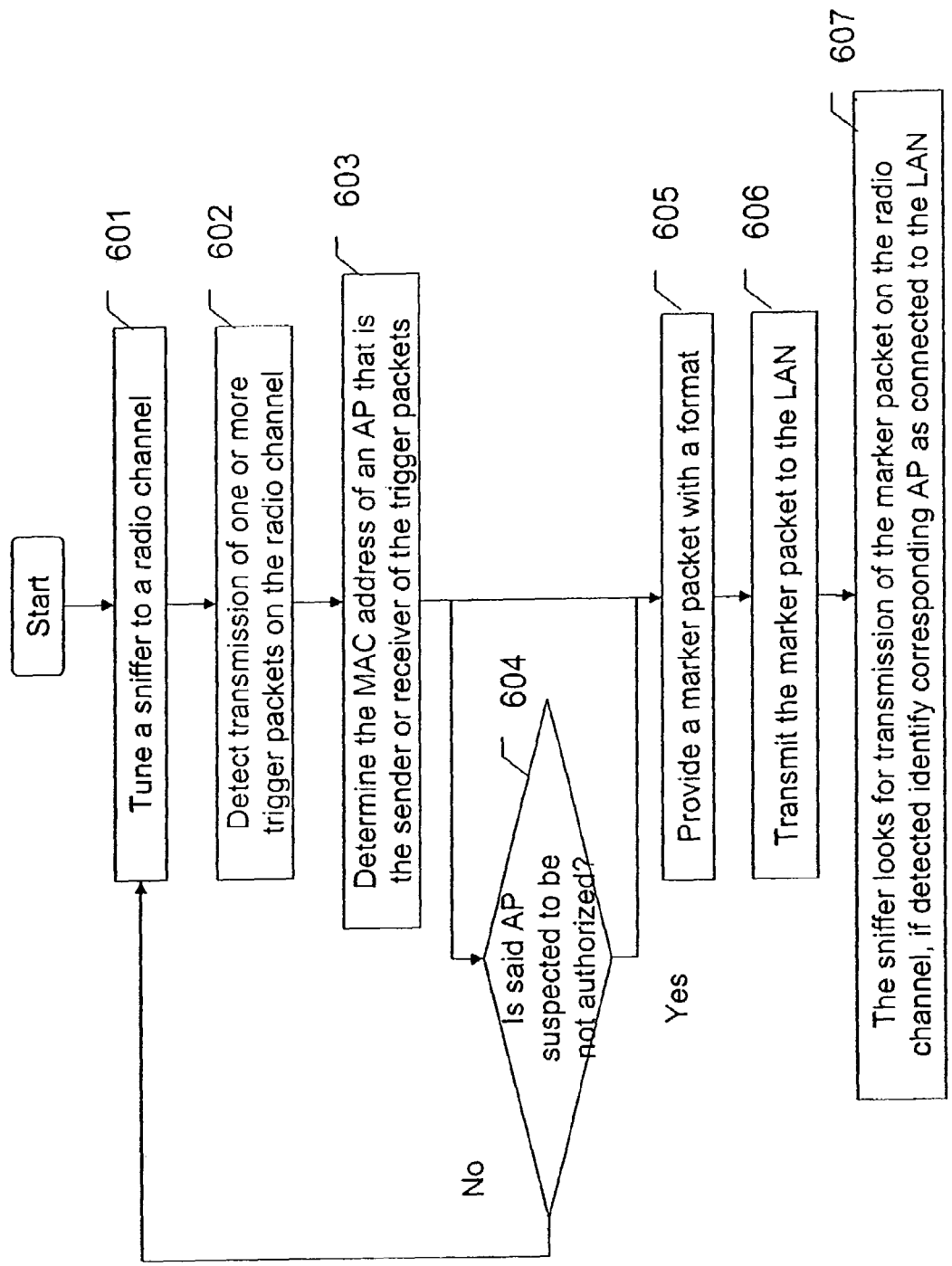
FIG. 6 shows a simplified logical flow of steps in yet another embodiment of the LAN connectivity test according to the present invention.

The logical flow of steps according to another embodiment of the LAN connectivity test is shown in FIG. 6. This diagram is merely an example, which should not unduly limit the scope of the claims herein. One of ordinary skill in the art would recognize other variations, modifications, and alternatives.

For this, in step 601 the sniffer is tuned to a radio channel. The sniffer listens to the radio channel to detect the transmission of one or more "trigger" packets. In a specific embodiment, the trigger packets indicate the current state of ongoing communication between an AP and a wireless station. Knowing this enables preparing and sending marker packet so that it is almost indistinguishable from the packets constituting the ongoing communication between the AP and the wireless station. This makes it difficult for certain APs, for example compromised, software controlled or non-standard, to evade detection by marker packet test.

When the transmission of one or more trigger packets is detected in step 602, the identity of the AP that is the source or destination of the trigger packets is determined in step 603 from the transmitter address or the receiver address in the 802.11 MAC header of the trigger packets.

Depending upon the type of trigger packets an optional step 604 is performed to determine if said AP is suspected to be not authorized (i.e. it can be unauthorized or external). For example an AP in the Active_AP_List that has not previously responded to any LAN connectivity test is suspected to be not authorized. Or, an AP whose behavior (contents of beacon frame, MAC address, authentication and encryption methods etc.) does not match the behavior known of the authorized APs is suspected to be not authorized.

In step 605 one or more marker packets are constructed based on the type of trigger packets and information contained therein. The marker packets are transmitted in the LAN in step 606. The sniffer continues to listen to the same radio channel to detect the transmission of at least one marker packet on the radio channel by said AP. If the marker packet transmission is detected before a timeout occurs, said AP is declared to be connected to the LAN. Alternatively, the AP is declared unconnected to the LAN according to a specific embodiment.

In one embodiment of the LAN connectivity test using trigger packets, the trigger packets and the marker packets are TCP packets. TCP is used by computers in Internet Protocol (IP) network for reliable exchange of data. TCP provides acknowledgement-based data delivery wherein lost pieces of data are recovered via retransmissions. The TCP also uses window-based congestion control algorithm so as to dynamically adapt to the available bandwidth between the communicating computers. A number of desirable Internet applications such as HTTP, file transfer, email, remote login etc. are performed using TCP as transport protocol.

Suppose the sniffer detects transmission of a TCP packet from a wireless station to the AP (called uplink direction) that is suspected to be not authorized. TCP packet is identified by examining the header fields of detected packet transmission. Specifically, for the TCP packet the value of "Type" field in 802.2 frame header is hexadecimal 0800 and the value of "Protocol" field in the IP header is hexadecimal 06. Then the marker packet is constructed as a TCP packet and in one embodiment the various fields in the marker packet (step 605 above) are set as follows:

Swap the source and destination addresses in the Ethernet, IP and TCP headers of trigger packet to get source and destination addresses in the corresponding headers of marker packet.

Set the TCP payload in marker packet such that it can later be identified by the intrusion detection. Let L denote the size of payload in number of octets.

Let x1 denote the value of "sequence number" field in the TCP header of trigger packet and x2 denote the number of octets of TCP payload in the trigger packet. Then set "acknowledgement number" field in the TCP header of marker packet equal to (x1+x2).

Let x3 denote the value of "acknowledgement number" field and x4 denote the value of "window" field in the TCP header of trigger packet. Then set the value of "sequence number" field in the TCP header of marker packet to a value that is between (x3−1) and (x3+x4−L).

Other fields in the marker packet are set according to standard practice used by various implementations of corresponding protocols. Among these, values for some of the fields can be more judiciously chosen if the sniffer has also recently captured a TCP packet of the same flow transmitted by said AP to said wireless station (downlink). For example, the value of "window" field in the marker packet can be set equal to or close to the value of "window" field in the recently captured downlink TCP packet. Similarly, the value of "Identification" field in the IP header of marker packet can be set greater than the value of "Identification" field in the recently captured downlink TCP packet.

Suppose that the sniffer detects downlink TCP packet. Then the marker packet is constructed as a TCP packet and in one embodiment the various fields in the marker packet (step 605 above) are set as follows:

a. Swap source and destination addresses in the Ethernet, IP and TCP headers of trigger packet to get source and destination addresses in the corresponding headers of marker packet.

b. Set the TCP payload in marker packet such that it can later be identified by the intrusion detection. Let L denote the size of payload in number of octets.

c. Let x1 denote the value of "sequence number" field in the TCP header of trigger packet and x2 denote the number of octets of TCP payload in the trigger packet. Then set sequence number field in the TCP header of marker packet to a value greater than (x1+x2−1). If the sniffer has recently captured uplink TCP packet of the same flow and thus the intrusion detection has the knowledge of value of "window" field in recent uplink packet, the value of "sequence number" field in marker packet should be chosen so that it is also less than (x1+window−L+1).

d. Other fields in the marker packet are set according to standard practice used by various implementations of corresponding protocols. Among these, values for some of the fields such as "window" field in TCP header and "Identification field in IP header can be more judiciously chosen if the sniffer has also recently captured uplink TCP packet of the same flow.

In another embodiment of the LAN connectivity test using trigger packets, the trigger packet is DHCP request packet and the marker packet is DHCP response packet.

In the preferred embodiment of the method of invention, in step 202 one or more feature criteria are used distinguish the APs in the Active_AP_List that are authorized by the network administrator from those that are not authorized. The latter include unauthorized and external APs. The method of invention works by inferring one or more features of an AP via analysis of the packets captured by the sniffer and comparing them with the features of the authorized APs. If the discrepancy is detected, said AP is deemed to be not authorized.

A number of features of an AP can be inferred by analyzing one or more beacon packets transmitted by the AP. These features include but not limited to the vendor information (indicated by the first three bytes of the MAC address of the AP), the observed beacon interval and values of various fields (according to basic 802.11 and its enhancements including 802.11e, 802.11i, 802.11k and others) in the beacon packet such as beacon interval, SSID, capabilities information, radio parameters, various information elements (IEs) etc.

Some other features of an AP can be inferred by analyzing the sequence of packets flowing between the AP and a wireless station. Most notably, the flow of authentication and association procedure can be monitored by the sniffer to determine if it is consistent with that of an authorized AP. A merely an example, the flow of authentication and association procedure may conform to technologies such as wired equivalent privacy (WEP), wireless protected access (WPA), temporal key integrity protocol (TKIP), robust security network (RSN), extensible authentication protocol (EAP), and the like.

The feature set of authorized APs can be provided to the intrusion detection system by the network administrator. Alternatively, the intrusion detection system can learn the authorized feature set by detecting APs and their associated feature set in the operational network or laboratory environment. In the former case, the network administrator merely indicates to the intrusion detection system as to which of the detected APs are authorized APs.

The sniffer may perform active probing to infer the features of an AP. For example, the sniffer attempts to establish a wireless connection with the AP which typically involves authentication and association procedure. The sniffer is provided with the credentials to be used during the authentication procedure. For example, the credentials include but not limited to password, digital certificate, security key etc. If the sniffer succeeds in establishing the wireless connection with the AP, the AP may be declared as authorized. This test is even more effective for the authentication schemes, such as extensible authentication protocol transport layer security (EAP TLS), which perform mutual authentication. Depending upon the embodiment, the present invention can implement the various methods using certain systems, which are described in more detail below.

Figure 7:
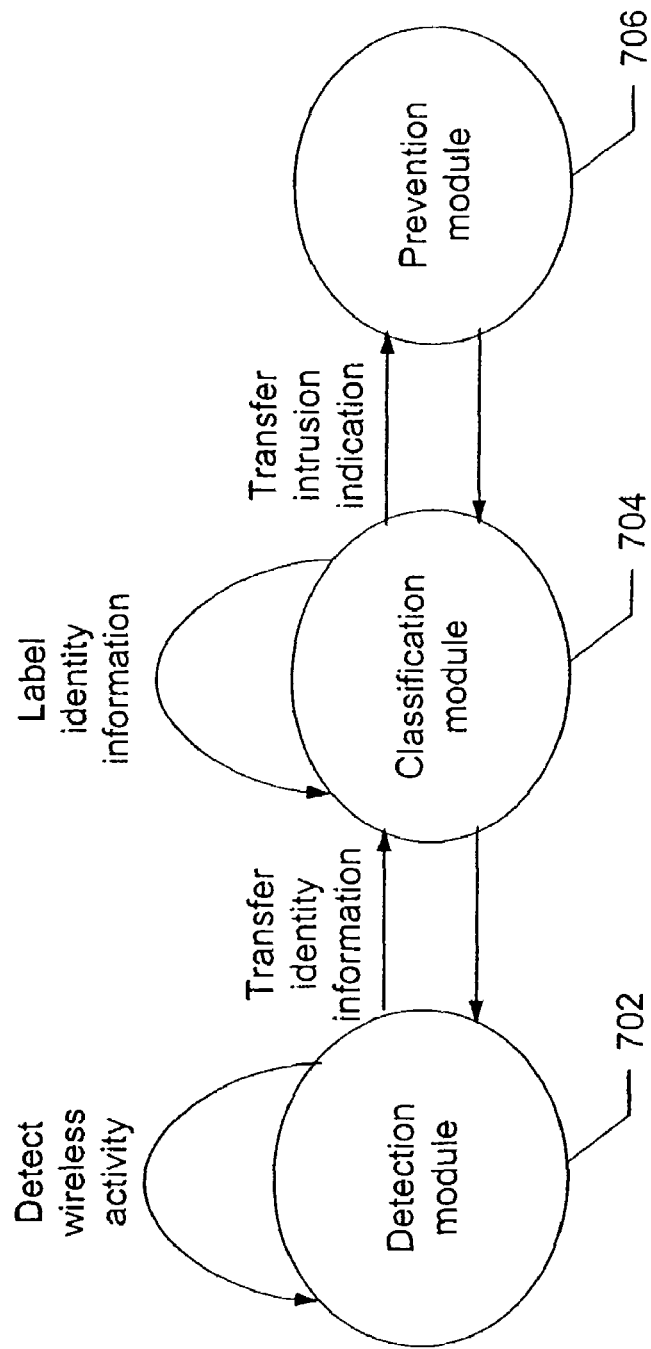
FIG. 7 is a simplified system diagram according to an embodiment of the present invention.

One embodiment of the intrusion detection system according to present invention is described with reference to FIG. 7. The system comprises a detection module 702, a classification module 704 and a prevention module 706, each of the modules comprising one or more computer executable codes. The various codes can be running in one or more computer processes. Further, the various codes may run in a single computer system or distributed across plurality of computer systems coupled together by one or more computer networks.

The detection module 702 is directed to performing tasks associated with detecting wireless activity. In a specific embodiment the detecting comprises capturing, decoding and processing the wireless activity. The detecting may further comprise filtering and summarizing the information associated with or derived from the wireless activity. The detection module is further directed to transferring at least identity information associated with the detected wireless activity to the classification module. In a specific embodiment the detection module transfers additional information associated with the detected activity such as information derived from beacon packet, marker packet, authentication packet and other packets to the classification module. The classification module 704 is directed to performing tasks associated with receiving and labeling the identity information associated with the wireless activity into at least one of a plurality of categories. In a specific embodiment, the classification module analyzes the additional information associated with the wireless activity received from the detection module for the sake of labeling the identity information. The classification module is further directed to performing tasks associated with transferring indication associated with the identity information to the prevention module 706. In one specific embodiment, the indication is an intrusion alert. In a specific embodiment, intrusion alert is generated when an unauthorized AP and/or intruding wireless station is detected by the classification process.

Figure 8:
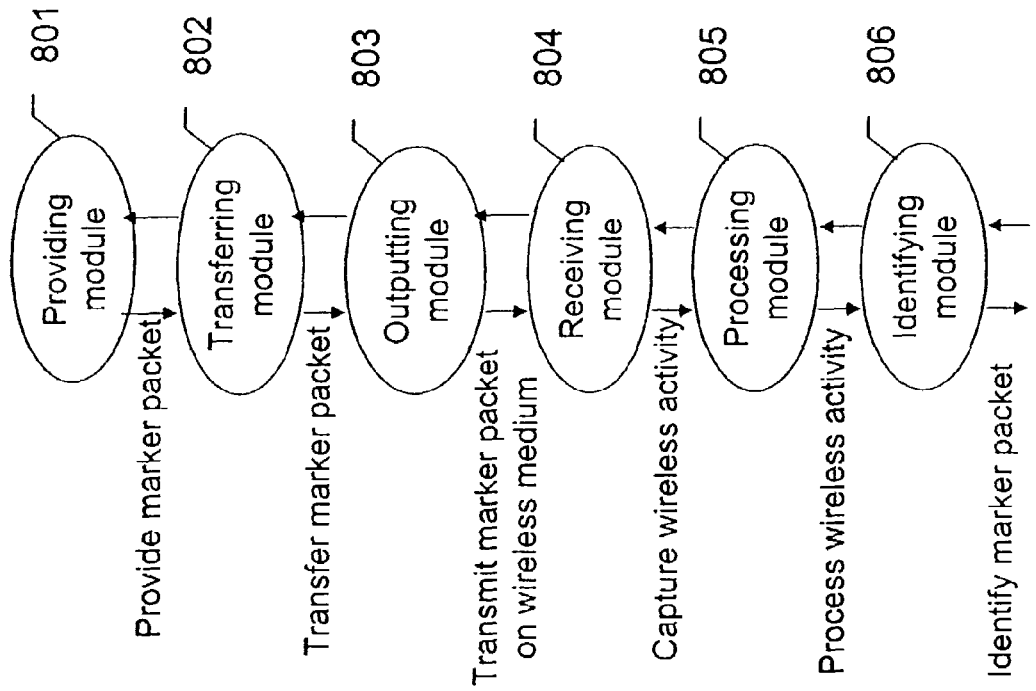
FIG. 8 is a simplified system diagram according to an alternative embodiment of the present invention.

Another embodiment of the intrusion prevention system according to present invention is described with reference to FIG. 8. The system comprises a providing module 801, a transferring module 802, an outputting module 803, a receiving module 804, a processing module 805 and an identifying module 806. Each of the modules comprises one or more computer executable codes. The providing module 801 prepares the marker packet with a given format. In a specific embodiment, the providing module resides within the originating device. The transferring module 802 transmits the marker packet to one or more APs over the LAN. In a specific embodiment the transferring module resides within the originating device. In an alternate embodiment, the transferring module resides within a computer system coupled to the local area network. The outputting module 803 transmits the marker packet from the AP to the wireless medium. In a specific embodiment, the outputting module resides within the AP. The receiving module 804 is directed to receiving wireless activity associated with the marker packet using at least one sniffer. The processing module 805 is directed to processing the wireless activity information to identify the marker packet. In a specific embodiment, the processing module analyzes the format information in the received wireless activity to identify the marker packet. The identifying module 806 is directed to determining the identity information associated with the wireless activity associated with the marker packet. In a specific embodiment, the identifying module determines the source AP of the wireless activity associated with the marker packet. In one specific embodiment, the receiving module, the processing module and the identifying module are provided within the sniffer device. In another specific embodiment, the receiving module is provided within the sniffer device while the processing and identifying module are provided within the data collection server. Other embodiments are also possible.

Figure 9:
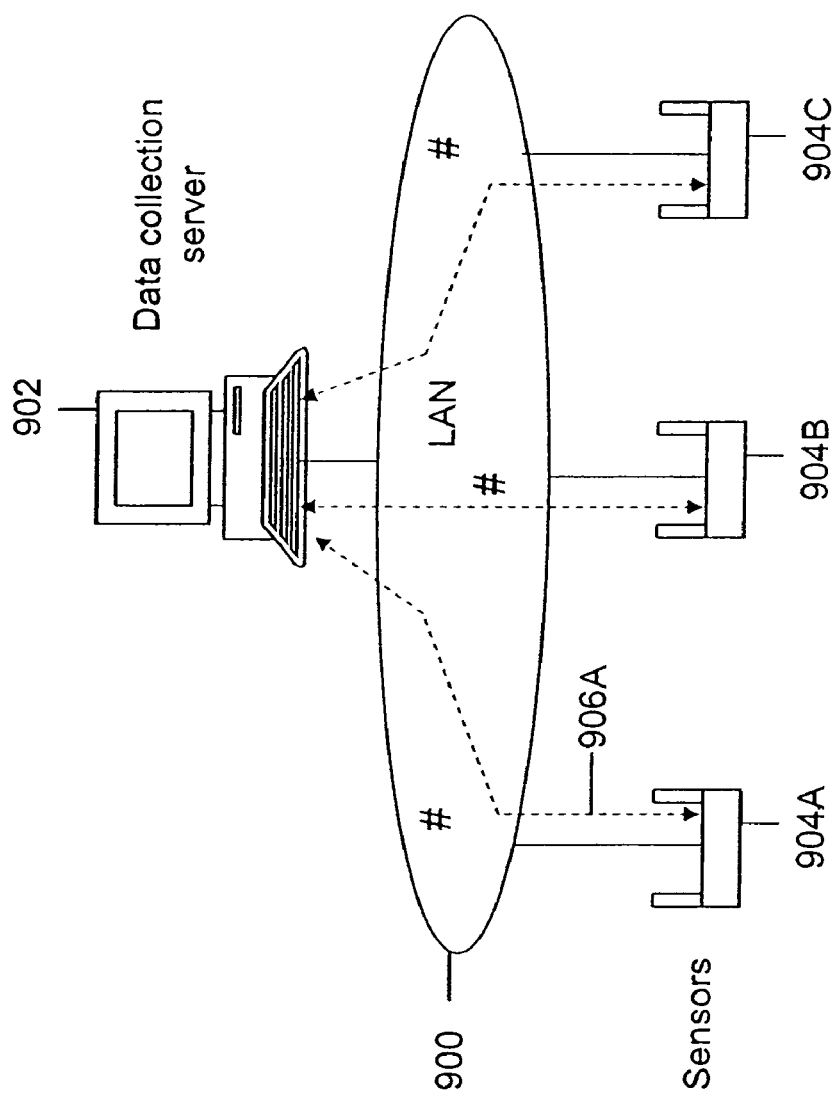
FIG. 9 is a simplified system diagram according to a distributed implementation embodiment of the present invention.

Another alternative embodiment of the intrusion detection system is described below with respect to FIG. 9. In this embodiment, the data collection server is provided as software that can be run on a PC or server computer 902. In a specific embodiment said PC or server computer is connected to the LAN 900. Input required from the network administrator is provided to the data collection server using web-based or command line interface (CLI) console. One or more sniffer devices 904A, 904B, 904C etc. are provided to monitor the wireless communication space. When any sniffer, for example sniffer 904A, is connected to the LAN, it sends multicast or broadcast query over the LAN to discover the data collection server. The data collection server 902 responds to the query with information required for the sniffer 904A to connect to the server 902. This information comprises at least of the IP address of the server. In an alternate embodiment, the IP address of the data collection server is preconfigured in the sniffers.

The sniffer 904A then communicates with the server. In a specific embodiment, the sniffer 904A establishes a connection 906A with the server using protocols such as transport control protocol (TCP), hypertext transfer protocol (HTTP), secure HTTP, file transfer protocol (FTP), remote login protocol such as telnet and the like. In alternate embodiment, connectionless protocol such as user datagram protocol (UDP) can be used for communication between the sniffer and the server. In a specific embodiment, the server 902 and the sniffer 904A authenticate each other at the time of initiation of communication and preferably also during the communication. The server sends configuration information to the sniffer. This information may comprise of the operating system software code and the various operational configuration parameters.

The sniffer 904A listens to the radio channels and reports information about detected wireless activity to the data collection server 902 for analysis, storage, processing and rendering. In a specific embodiment, the data collection server displays the information about the state of the network graphically on the computer screen. The sniffer may filter or summarize this information before reporting it to the server. The sniffer may also receive instructions from the server, for example, as regards tuning to specific radio channel, detecting transmission of specific packet such as the marker packet on the radio channel, detecting wireless activity derived from a specific station or an access point etc. In a specific embodiment, the sniffer 904A initiates LAN connectivity test, i.e., by originating a marker packet. In alternate embodiment, the LAN connectivity test is initiated by the data collection server.

Upon the detection of an unauthorized AP and/or intruding wireless station, in a specific embodiment the data collection server 902 selects one or more sniffer devices to perform preventive actions against the intrusion and sends a message to said sniffer devices to perform preventive actions.

Figure 10:
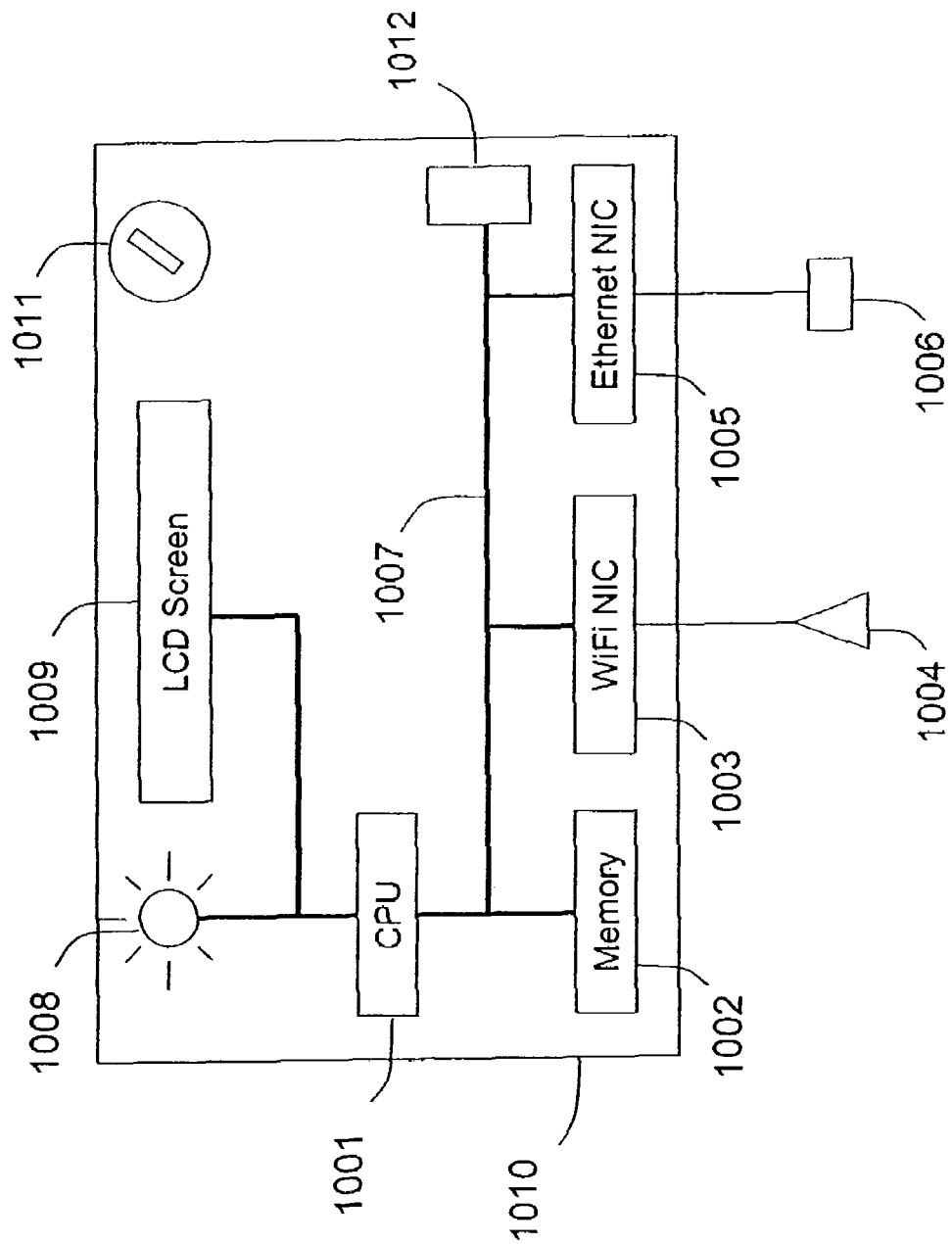
FIG. 10 is a simplified system diagram of a standalone implementation according to an embodiment of the present invention.

Another yet an alternative embodiment of the intrusion detection system is described below with reference to FIG. 10. In this embodiment, the detection, classification and prevention modules are provided within the sniffer device. The sniffer also provides and transfers a maker packet. The sniffer further receives the wireless activity associated with the marker packet, processes said activity to identify the marker packet and identifies the AP that transmits marker packet on the wireless medium. This embodiment in particularly advantageous because it allows deployment of standalone sniffer devices, i.e., as appliances not requiring a separate data collection server entity.

Accordingly, the sniffer appliance device comprises a CPU 1001 adapted to executing computer codes and a memory 1002 that stores computer codes and data. The computer codes stored in the memory comprise at least the codes for detection, classification and prevention modules and the codes adapted to perform communication between said modules. The computer codes stored in the memory further comprise the codes for providing a marker packet, transferring a marker packet, receiving a wireless activity associated with the marker packet, processing said wireless activity to identify the marker packet and identifying the AP that transmits the marker packet on the wireless medium. The sniffer appliance device comprises one or more WiFi NICs 1003 connected to one or more antennas 1004. The WiFi NICs performs the tasks associated with receiving the wireless activity (e.g., listening to and capturing the packet transmissions occurring over the wireless medium in accordance with 802.11 standard) as well as initiating the wireless activity (e.g., transmitting packets in accordance with 802.11 standard). The Ethernet NIC 1005 is also provided that enables connecting the sniffer appliance device to the LAN via Ethernet jack 1006. The Ethernet jack 1006 may alternatively and additionally be used to connect the sniffer appliance to a PC for configuration purposes. Alternatively, a serial communication interface (e.g., RS-232) 1012 is used to connect the sniffer appliance to a PC for configuration purposes. The various electronic components are connected together using data transfer bus 1007. The sniffer device can provide visual indication about detected wireless activity by means of one or more light bulbs or light emitting diodes 1008 provided on the device panel 1010. Optionally or in addition to, an electronic screen such as for example LCD screen 1009 is provided on the device panel for providing visual indication and/or textual messages.

After the sniffer device is powered on, the light bulb 1008 turns white in color if Active_AP_List is empty. The bulb turns green when at least one active AP is detected. The sensor exhibits above behavior even if it is not connected to the wired LAN. After the sensor device is connected to the wired LAN (e.g., using Ethernet jack 1006), it can start executing steps 202 and beyond shown in FIG. 2 according to the specific embodiment of the method of invention. If the unauthorized AP is detected in step 202, the light bulb turns red in color. If the wireless station attempting to connect or connected to the unauthorized AP is detected in step 203, the light bulb turns flashing red. Alternatively, the various visual indications are provided via combination of light bulbs from a plurality of light bulbs provided on the device panel. Yet alternately, such indications can also be given in audio form, for example via different types of alarm sounds from the speaker (not shown in FIG. 10). An on/off switch 1011 may be provided on the sniffer device panel that enables turning the intrusion defense step 204 on or off. Alternatively, the on/off switch for activating and deactivating the intrusion defense is software controlled. Yet alternatively, the step 204 is executed automatically after intrusion detection.

The above sequence of steps provides methods according to an embodiment of the present invention. As shown, the method uses a combination of steps including a way of detecting for an intrusion using wireless computer networks. In preferred embodiments, the present invention also includes an automated method for transferring an indication of an intrusion to a prevention process, which would preferably stop the intruding device before any security problems or the like. Many other methods and system are also included. Of course, other alternatives can also be provided where steps are added, one or more steps are removed, or one or more steps are provided in a different sequence without departing from the scope of the claims herein. Additionally, the various methods can be implemented using a computer code or codes in software, firmware, hardware, or any combination of these. Depending upon the embodiment, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for monitoring for unauthorized wireless access to computer networks, the method comprising:

receiving a list of one or more wireless access point devices which are allowed to be connected to a computer network within a selected geographic region, the computer network being at least a portion of a local area computer network to be protected from one or more wireless intrusions;

positioning one or more sniffer devices within the selected geographic region;

monitoring wireless communications within the selected geographic region using at least one of the one or more sniffer devices;

detecting an active wireless access point device from the monitored wireless communications, the active wireless access point device being configured to perform a network address translation function between its wired and wireless interfaces, the active wireless access point device being not among the one or more wireless access point devices which are allowed to be connected to the computer network;

transmitting a marker packet over a wireless link to the active wireless access point device using at least one of the one or more sniffer devices, the marker packet being adapted to be transferred through the active wireless access point device to an authorized computing device connected to the computer network, the transmitting being at least for determining whether the active wireless access point device is connected to the computer network, the marker packet including a format information identifiable by the authorized computing device;

identifying the format information in a packet received at the authorized computing device to infer that the received packet is the marker packet; and determining that the active wireless access point device provides unauthorized wireless access to the computer network based at least upon the inferring that the marker packet is received at the authorized computing device connected to the computer network.

2. The method of claim 1 wherein the detecting the active wireless access point device from the monitored wireless communications comprises detecting a packet within the monitored wireless communications including identity information associated with the active wireless access point device.

3. The method of claim 2 wherein the identity information included in the packet comprises a wireless MAC address of the active wireless access point device, the wireless MAC address being included in the packet to identify the active wireless access point device as either a transmitter or as a recipient of the packet.

4. The method of claim 2 wherein the identity information included in the packet comprises a service set identifier (SSID) associated with the active wireless access point device.

5. The method of claim 1 wherein the monitoring the wireless communications within the selected geographic region comprises detecting the wireless communications within the selected geographic region, decoding the wireless communications, and processing the wireless communications.

6. The method of claim 1 wherein the one or more wireless access point devices which are allowed to be connected to the computer network within the selected geographic region are authorized wireless access point devices.

7. The method of claim 1 and further comprising initiating a prevention process, the prevention process being for hindering wireless communication between the active wireless access point device and one or more wireless stations.

8. A method for monitoring for unauthorized wireless access to computer networks, the method comprising:
receiving a list of one or more wireless access point devices which are allowed to be connected to a computer network within a selected geographic region, the computer network being at least a portion of a local area computer network to be protected from one or more wireless intrusions;
positioning one or more sniffer devices within the selected geographic region;
monitoring wireless communications within the selected geographic region using at least one of the one or more sniffer devices;
detecting an active wireless access point device from the monitored wireless communications, the active wireless access point device being configured to perform a network address translation function between its wired and wireless interfaces, the active wireless access point device being not among the one or more wireless access point devices which are allowed to be connected to the computer network;
transmitting a marker packet over a wireless link to the active wireless access point device using at least one of the one or more sniffer devices, the marker packet being adapted to be transferred through the active wireless access point device to an authorized computing device connected to the computer network, the transmitting being at least for determining whether the active wireless access point device is connected to the computer network, the marker packet including a format information identifiable by the authorized computing device;
determining that the format information is not identified in one or more packets received at the authorized computing device to infer that the marker packet is not received at the authorized computing device; and
determining, based in part on the inferring that the marker packet is not received, that the active wireless access point device does not provide unauthorized wireless access to the computer network while sharing wireless airspace within the selected geographic region with the one or more wireless access point devices which are allowed to be connected to the computer network.

9. A method for monitoring for unauthorized wireless access to computer networks, the method comprising:
receiving a list of one or more wireless access points, each of the one or more wireless access points being allowed to be connected to a computer network within a selected geographic region, each of the one or more wireless access points being configured to use one or more security procedures on one or more wireless links associated with it to prevent unauthorized wireless access through it, the computer network being at least a portion of a local area computer network to be protected from one or more wireless intrusions;
positioning one or more sniffer devices within the selected geographic region;
monitoring wireless communications within the selected geographic region using a first sniffer device from the one or more sniffer devices;
detecting an active wireless access point from the monitored wireless communications, the active wireless access point being configured to perform a network address translation function between its wired and wireless interfaces;
transmitting a marker packet over a wireless link to the active wireless access point using a second sniffer device from the one or more sniffer devices, the marker packet being adapted to be transferred through the active wireless access point to an authorized computing device connected to the computer network, the transmitting being at least for determining whether the active wireless access point is connected to the computer network;
determining that the marker packet is received at the computing device connected to the computer network; and
determining that the active wireless access point provides unauthorized wireless access to the computer network based at least upon the determining that the marker packet is received at the authorized computing device connected to the computer network.

10. The method of claim 9 wherein the first sniffer device is same as or different from the second sniffer device.

11. The method of claim 9 wherein the wireless link is established between the second sniffer device and the active wireless access point.

12. The method of claim 9 wherein the wireless link is established between a wireless station other than the second sniffer device and the active wireless access point.

13. The method of claim 12 wherein the second sniffer device interjects the marker packet over the wireless link established between the wireless station other than the second sniffer device and the active wireless access point.

14. The method of claim 13 wherein the second sniffer device spoofs identity of the wireless station while interjecting the marker packet.

15. The method of claim 9 wherein the active wireless access point is not configured to use any security procedure on one or more wireless links associated with it, the security procedure being for preventing unauthorized wireless access through the active wireless access point.

16. The method of claim 9 wherein the one or more security procedures include encryption of wireless communications that occur over the one or more wireless links associated with the each of the one or more wireless access points.

17. The method of claim 9 wherein the one or more security procedures include authentication of one or more wireless stations that use the one or more wireless links, respectively, associated with the each of the one or more wireless access points.

18. A method for monitoring for unauthorized wireless access to computer networks, the method comprising:
 receiving a list of one or more wireless access points, each of the one or more wireless access points being allowed to be connected to a computer network within a selected geographic region, each of the one or more wireless access point devices being configured to use one or more security procedures on one or more wireless links associated with it to prevent unauthorized wireless access through it, the computer network being at least a portion of a local area computer network to be protected from one or more wireless intrusions;
 positioning one or more sniffer devices within the selected geographic region;
 monitoring wireless communications within the selected geographic region using at least one of the one or more sniffer devices;
 detecting an active wireless access point from the monitored wireless communications, the active wireless access point being configured to perform a network address translation function between its wired and wireless interfaces, the active wireless access point being configured to not use any security procedures on one or more wireless links associated with it to prevent unauthorized wireless access through it;
 transmitting a marker packet over a wireless link to the active wireless access point using at least one of the one or more sniffer devices, the marker packet being adapted to be transferred through the active wireless access point to an authorized computing device connected to the computer network, the transmitting being at least for determining whether the active wireless access point is connected to the computer network;
 determining that the marker packet is not received at the computing device connected to the computer network; and
 determining, based in part on the determining that the marker packet is not received, that the active wireless access point does not provide unauthorized wireless access to the computer network while sharing wireless airspace within the selected geographic region with the one or more wireless access point which are allowed to be connected to the computer network.

19. A computer based system for monitoring unauthorized wireless access to computer networks, the system comprising:
 a first wireless communication interface to receive one or more wireless signals within its vicinity;
 a second wireless communication interface to transmit one or more wireless signals within its vicinity; and
 one or more computer memories, the one or more computer memories comprising:
  one or more codes directed to receiving information associated with a feature set associated with an authorized wireless access point device, the authorized wireless access point device being allowed to be connected to a computer network within a selected geographic region, the computer network being at least a portion of a local area computer network to be protected from one or more wireless intrusions;
  one or more codes directed to processing information associated with the one or more wireless signals received using the first wireless communication interface to identify an active wireless access point device and to identify a feature set associated with the active wireless access point device;
  one or more codes directed to transmitting a marker packet over a wireless link to the active wireless access point device using the second wireless communication interface, the marker packet being adapted to be transferred through the active wireless access point device to an authorized computing device connected to the computer network, the transmitting being at least for determining whether the active wireless access point device is connected to the computer network, the marker packet including a format information identifiable by the authorized computing device;
  one or more codes directed to identifying the format information in a packet received at the authorized computing device to infer that the received packet is the marker packet; and
  one or more codes directed to determining that the active wireless access point device provides unauthorized wireless access to the computer network based at least upon the inferring that the marker packet is received at the authorized computing device connected to the computer network.

20. The system of claim 19 wherein the first wireless communication interface and the second wireless communication interface are provided within a sniffer device.

21. The system of claim 19 wherein the first wireless communication interface is same as the second wireless communication interface.

22. The system of claim 19 wherein the first wireless communication interface is different from the second wireless communication interface.

23. The system of claim 19 wherein the feature set associated with the authorized wireless access point device which is allowed to be connected to the computer network comprises one or more features selected from the group consisting of encryption method for wireless link, authentication method for wireless link, and MAC address of a wireless interface of the wireless access point device which is allowed to be connected to the computer network.

24. The system of claim 19 wherein the feature set associated with the active wireless access point device comprises one or more features selected from the group consisting of encryption method for wireless link, authentication method for wireless link, and MAC address of a wireless interface of the active wireless access point device.

25. The system of claim 19 and further comprising:
 one or more codes within the one or more computer memories directed to comparing the feature set associated with the active access point device with the feature set associated with the authorized wireless access point device which is allowed to be connected to the computer network within the selected geographic region; and
 one or more codes within the one or more computer memories directed to ascertaining a difference between the feature set associated with the active access point device and the feature set associated with the authorized wireless access point device which is allowed to be connected to the computer network within the selected geographic region.

* * * * *

(12) EX PARTE REEXAMINATION CERTIFICATE (10428th)
United States Patent
Bhagwat et al.

(10) Number: US 7,536,723 C1
(45) Certificate Issued: *Dec. 8, 2014

(54) AUTOMATED METHOD AND SYSTEM FOR MONITORING LOCAL AREA COMPUTER NETWORKS FOR UNAUTHORIZED WIRELESS ACCESS

(75) Inventors: Pravin Bhagwat, Kendall Park, NJ (US); Shantanu Gogate, Pune (IN); David C. King, Menlo Park, CA (US)

(73) Assignee: AirTight Networks, Inc., Mountain View, CA (US)

Reexamination Request:
No. 90/013,166, Feb. 26, 2014

Reexamination Certificate for:
Patent No.: 7,536,723
Issued: May 19, 2009
Appl. No.: 10/931,926
Filed: Aug. 31, 2004

(*) Notice: This patent is subject to a terminal disclaimer.

Related U.S. Application Data

(60) Provisional application No. 60/543,631, filed on Feb. 11, 2004.

(51) Int. Cl.
*G06F 11/00* (2006.01)
*G06F 12/16* (2006.01)
*G06F 15/18* (2006.01)
*G08B 23/00* (2006.01)

(52) U.S. Cl.
USPC .............. 726/23; 726/22; 726/24; 726/25

(58) Field of Classification Search
None
See application file for complete search history.

(56) References Cited

To view the complete listing of prior art documents cited during the proceeding for Reexamination Control Number 90/013,166, please refer to the USPTO's public Patent Application Information Retrieval (PAIR) system under the Display References tab.

*Primary Examiner* — Minh Dieu Nguyen

(57) ABSTRACT

According to an embodiment of the present invention, the wireless activity in a geographic area containing LAN connection ports is monitored using one or more sensor devices, called sniffers. By analyzing said wireless activity, one or more APs that are operating in said geographic area are identified. The active APs so identified are classified into three categories, namely "authorized" APs (those that are allowed by network administrator), "unauthorized" APs (those that are not allowed by the network administrator, but are still connected to the LAN of interest) and "external" APs (those that are not allowed by network administrator but are not connected to the LAN of interest, for example APs connected to the neighbor's LAN) by conducting one or more tests. The sniffers continue to monitor the selected geographic area to detect any wireless station attempting to connect to or communicating with the one or more identified unauthorized APs. Upon identifying unauthorized AP and/or intruding wireless station an indication is transferred to the prevention process.

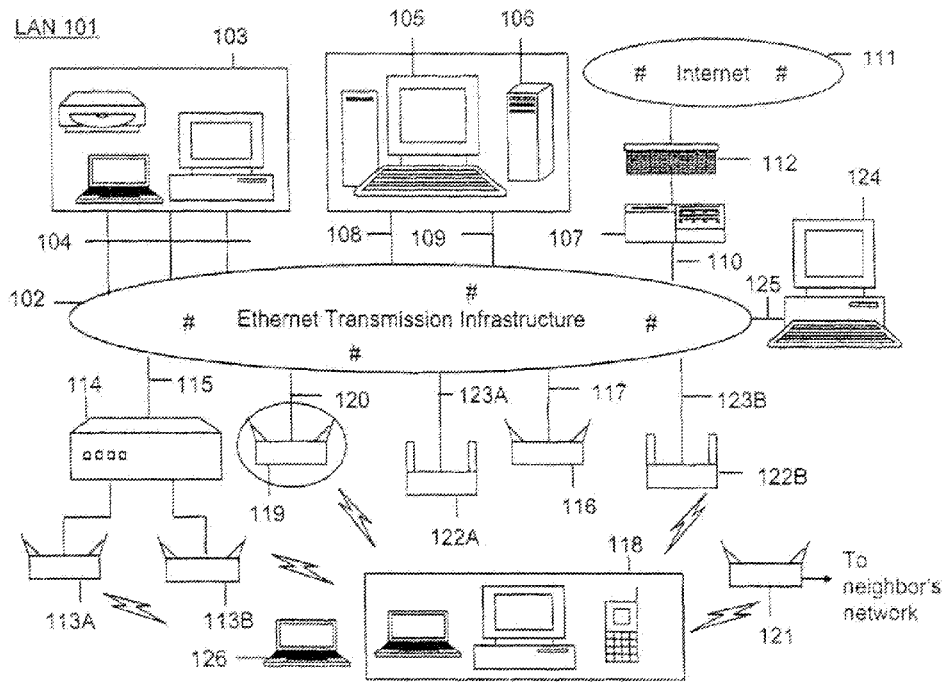

＃ EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-12 and 15-25 are cancelled.

Claims 13-14 are determined to be patentable as amended.

13. [The method of claim 12] *A method for monitoring for unauthorized wireless access to computer networks, the method comprising:*

*receiving a list of one or more wireless access points, each of the one or more wireless access points being allowed to be connected to a computer network within a selected geographic region, each of the one or more wireless access points being configured to use one or more security procedures on one or more wireless links associated with it to prevent unauthorized wireless access through it, the computer network being at least a portion of a local area computer network to be protected from one or more wireless intrusions;*

*positioning one or more sniffer devices within the selected geographic region;*

*monitoring wireless communications within the selected geographic region using a first sniffer device from the one or more sniffer devices;*

*detecting an active wireless access point from the monitored wireless communications, the active wireless access point being configured to perform a network address translation function between its wired and wireless interfaces;*

*transmitting a marker packet over a wireless link to the active wireless access point using a second sniffer device from the one or more sniffer devices, the marker packet being adapted to be transferred through the active wireless access point to an authorized computing device connected to the computer network, the transmitting being at least for determining whether the active wireless access point is connected to the computer network;*

*determining that the marker packet is received at the computing device connected to the computer network; and*

*determining that the active wireless access point provides unauthorized wireless access to the computer network based at least upon the determining that the marker packet is received at the authorized computing device connected to the computer network;*

*wherein the wireless link is established between a wireless station other than the second sniffer device and the active wireless access point, and*

*wherein the second sniffer device interjects the marker packet over the wireless link established between the wireless station other than the second sniffer device and the active wireless access point.*

14. [The method of claim 13] *A method for monitoring for unauthorized wireless access to computer networks, the method comprising:*

*receiving a list of one or more wireless access points, each of the one or more wireless access points being allowed to be connected to a computer network within a selected geographic region, each of the one or more wireless access points being configured to use one or more security procedures on one or more wireless links associated with it to prevent unauthorized wireless access through it, the computer network being at least a portion of a local area computer network to be protected from one or more wireless intrusions;*

*positioning one or more sniffer devices within the selected geographic region;*

*monitoring wireless communications within the selected geographic region using a first sniffer device from the one or more sniffer devices;*

*detecting an active wireless access point from the monitored wireless communications, the active wireless access point being configured to perform a network address translation function between its wired and wireless interfaces;*

*transmitting a marker packet over a wireless link to the active wireless access point using a second sniffer device from the one or more sniffer devices, the marker packet being adapted to be transferred through the active wireless access point to an authorized computing device connected to the computer network, the transmitting being at least for determining whether the active wireless access point is connected to the computer network;*

*determining that the marker packet is received at the computing device connected to the computer network; and*

*determining that the active wireless access point provides unauthorized wireless access to the computer network based at least upon the determining that the marker packet is received at the authorized computing device connected to the computer network;*

*wherein the wireless link is established between a wireless station other than the second sniffer device and the active wireless access point,*

*wherein the second sniffer device interjects the marker packet over the wireless link established between the wireless station other than the second sniffer device and the active wireless access point, and*

*wherein the second sniffer device spoofs identity of the wireless station while interjecting the market packet.*

\* \* \* \* \*